United States Patent
Liboiron-Ladouceur et al.

(10) Patent No.: US 9,705,630 B2
(45) Date of Patent: Jul. 11, 2017

(54) OPTICAL INTERCONNECTION METHODS AND SYSTEMS EXPLOITING MODE MULTIPLEXING

(71) Applicants: THE ROYAL INSTITUTION FOR THE ADVANCEMENT OF LEARNING / MCGILL UNIVERSITY, Montreal (CA); SCUOLA SUPERIORE SANT'ANNA, Pisa (IT)

(72) Inventors: Odile Liboiron-Ladouceur, Montreal (CA); Nicola Andriolli, Pisa (IT); Isabella Cerutti, Pisa (IT); Philippe Velha, San Giuliano Terme (IT)

(73) Assignees: THE ROYAL INSTITUTION FOR THE ADVANCEMENT OF LEARNING/MCGILL UNIVERSITY, Montreal (CA); SCUOLA SUPERIORE SANT'ANNA, San Giuliano (IT)

( * ) Notice: Subject to any disclaimer, the term of this patent is extended or adjusted under 35 U.S.C. 154(b) by 0 days.

(21) Appl. No.: 14/868,578

(22) Filed: Sep. 29, 2015

(65) Prior Publication Data
US 2016/0094308 A1   Mar. 31, 2016
US 2017/0155465 A9   Jun. 1, 2017

Related U.S. Application Data

(60) Provisional application No. 62/056,650, filed on Sep. 29, 2014.

(51) Int. Cl.
*H04J 14/04* (2006.01)
*G02B 6/293* (2006.01)
(Continued)

(52) U.S. Cl.
CPC .......... *H04J 14/04* (2013.01); *G02B 6/12004* (2013.01); *G02B 6/2938* (2013.01);
(Continued)

(58) Field of Classification Search
CPC ...... H04B 10/2581; H04J 14/04; H04J 14/02; G02B 6/14; G02B 6/243; G02B 6/262;
(Continued)

(56) References Cited

U.S. PATENT DOCUMENTS 7,609,918 B2   10/2009   Narevicius
8,649,639 B2   2/2014    Mekis et al.
(Continued)

FOREIGN PATENT DOCUMENTS

CN   103023600 A      4/2013
WO   2013188592 A1   12/2013
(Continued)

OTHER PUBLICATIONS

Farrington et al., "Facebook's Data Centre Network Architecture", IEEE Optical Interconnects Conference, 2013 available at http://nathanfarrington.com/presentations/facebook-optics-oida13-slides.pptx.

(Continued)

*Primary Examiner* — Ted Wang
(74) *Attorney, Agent, or Firm* — Norton Rose Fulbright Canada LLP; Alexandre Daoust

(57) ABSTRACT

Optical solutions to address and overcome the issues of superseding/replacing electrical interconnection networks have generally exploited some form of optical space switching. Such optical space switching architectures required multiple switching elements, leading to increased power consumption and footprint issues. Accordingly, it would be beneficial for new optical, e.g. fiber optic or integrated optical, interconnection architectures to address the tradi- (Continued)

tional hierarchal time-division multiplexed (TDM) space based routing and interconnection to provide reduced latency, increased flexibility, lower cost, and lower power consumption. Accordingly, it would be beneficial to exploit networks operating in multiple domains by overlaying mode division multiplexing to provide increased throughput in bus, point-to-point networks, and multi-cast networks, for example, discretely or in combination with wavelength division multiplexing.

18 Claims, 18 Drawing Sheets

(51) Int. Cl.
  *G02B 6/12* (2006.01)
  *H04J 14/02* (2006.01)
  *H04Q 11/00* (2006.01)
  *H04B 10/2581* (2013.01)

(52) U.S. Cl.
  CPC .......... *H04B 10/2581* (2013.01); *H04J 14/02* (2013.01); *H04Q 11/0005* (2013.01); *H04Q 2011/0016* (2013.01); *H04Q 2011/0024* (2013.01)

(58) Field of Classification Search
  CPC .............. G02B 6/2938; G02B 6/12004; H04Q 11/0005; H04Q 2011/0016; H04Q 2011/0024
  See application file for complete search history.

(56) References Cited

U.S. PATENT DOCUMENTS

| | | | |
|---|---|---|---|
| 8,724,934 B2 | 5/2014 | Bagheri et al. | |
| 2003/0163555 A1* | 8/2003 | Battou | G06F 8/65 709/223 |
| 2004/0037572 A1* | 2/2004 | Matsuyama | H04B 10/2572 398/208 |
| 2008/0193079 A1 | 8/2008 | Cheben et al. | |
| 2011/0280569 A1 | 11/2011 | Binkert et al. | |
| 2012/0008946 A1 | 1/2012 | Andriolli et al. | |
| 2013/0330037 A1 | 12/2013 | Assefa et al. | |
| 2013/0330076 A1 | 12/2013 | Liboiron-Ladouceur et al. | |
| 2016/0057515 A1* | 2/2016 | Lord | H04J 14/0204 398/45 |

FOREIGN PATENT DOCUMENTS

| | | |
|---|---|---|
| WO | 2013192381 A1 | 12/2013 |
| WO | 2014030575 A1 | 2/2014 |
| WO | 2014030576 A1 | 2/2014 |
| WO | 2014030578 A1 | 2/2014 |
| WO | 2014034249 A1 | 3/2014 |
| WO | 2014034654 A1 | 3/2014 |

OTHER PUBLICATIONS

C. Kachris and I. Tomkos, "A Survey on Optical Interconnects for Data Centers," Communications Surveys&Tutorials, IEEE , vol. 14, No. 4, pp. 1021,1036, Fourth Quarter 2012.

O. Liboiron-Ladouceur, I. Cerutti, P. G. Raponi, N. Andriolli, and P. Castoldi; "Energy Efficient Design of a Scalable Optical Multi-Plane Interconnection Architecture," IEEE J. Sel. Topics Quantum Electron., vol. 17, No. 2, Mar./Apr. 2011, pp. 377-383.

O. Liboiron-Ladouceur, P. G. Raponi, N. Andriolli, I. Cerutti, M. S. Hai, P. Castoldi; "A Scalable Space-Time Multi-Plane Optical Interconnection Network using Energy Efficient Enabling Technologies," IEEE/OSA J.Optic. Commun. and Netw., vol. 3, No. 8, Aug. 2011, pp. A1-A11.

P. G. Raponi, N. Andriolli, I. Cerutti, and P. Castoldi; "Two-Step Scheduling Framework for Space-Wavelength Modular Optical Interconnection Networks," IET Communications, vol. 4, No. 18, Dec. 2010, pp. 2155-2165.

D. Dai et al., "Silicon Multimode Photonic Integrated Devices for On-Chip Mode-Division-Multiplexed Optical Interconnects," Progress in Electromagnetics Research, vol. 143, pp. 773-819, 2013.

L.H. Gabrielli et al., "On-chip transformation optics for multimode waveguide bends," Nature Commun., 2012.

L. W. Luo et al., "WDM-compatible mode-division multiplexing on a silicon chip," Nature Commun., 2014.

K. Hamamoto, "Optical Mode Switch for High Speed Switching Network," in Proc. PS2014.

* cited by examiner

OPTICAL INTERCONNECTION METHODS AND SYSTEMS EXPLOITING MODE MULTIPLEXING

CROSS-REFERENCE TO RELATED APPLICATIONS

This patent application also claims the benefit of U.S. Provisional Patent Applications 62/056,650 filed Sep. 29, 2014 entitled "Mode Multiplexing Optical Interconnection Methods and Systems", the entire contents of which are incorporated herein by reference.

FIELD OF THE INVENTION

This invention relates to optical interconnection networks and more particularly to circuit board level, interchip, and intrachip optical interconnections and networks.

BACKGROUND OF THE INVENTION

Optical fiber communications is seen as one of the most reliable telecommunication technologies to achieve consumers' needs for present and future applications. It is reliable in handling and transmitting data through hundreds of kilometers with an acceptable bit error rate and today, optical fiber communication dominates as the physical medium for medium and long distance data transmission systems and telecommunications networks. At the same time optical fiber solutions now appear in short-haul applications, local area networks, fiber-to-the-home/curb/cabinet, and digital cable systems. Over the same 30 year time period (1984-2014) as optical networks have evolved from initial 140 Mb/s links to wavelength division multiplexed Tb/s links microprocessors have evolved from single core 20 MHz processors to 4 and 6 core 2-4 GHz desktop and server processors and 60 core 1 GHz server processors. Meanwhile Internet evolved from a few million users on desktop computers to nearly three billion users representing approximately 40% of the global population on a range of devices from laptops through smart televisions to gaming consoles and smart phones.

Data centres are facilities that store and distribute the data on the Internet. With an estimated 14 trillion web pages on over 750 million websites, data centres contain a lot of data. Further, with almost three billion Internet users accessing these websites, including a growing amount of high bandwidth video, there is a massive amount of data being uploaded and downloaded every second on the Internet. At present the compound annual growth rate (CAGR) for global IP traffic between users is between 40% based upon Cisco's analysis (see http://www.cisco.com/en/US/solutions/collateral/ns341/ns525/ns537/ns705/ns827/white_paper c11-481360_ns827_Networking_Solutions_White_Paper.html) and 50% based upon the University of Minnesota's Minnesota Internet Traffic Studies (MINTS) analysis. By 2016 this user traffic is expected to exceed 100 exabytes per month, or over 42,000 gigabytes per second. However, peak demand will be considerably higher with projections of over 600 million users streaming Internet high-definition video simultaneously at peak times. All of this data flowing into and out of these data centres will generally be the result of data transfers between data centres and within data centres so that these overall IP traffic flows must, in reality, be multiplied many times to establish the total IP traffic flows.

Data centres are filled with tall racks of electronics surrounded by cable racks where data is typically stored on big, fast hard drives. Servers are computers that take requests and move the data using fast switches to access the right hard drives and either write or read the data to the hard drives. In mid-2013 Microsoft stated it had itself over 1 million servers. Connected to these servers are routers that connect the servers to the Internet and therein the user and/or other data centres.

According to Facebook™, see for example Farrington et al. in "Facebook's Data Centre Network Architecture" (IEEE Optical Interconnects Conference, 2013 available at http://nathanfarrington.com/presentations/facebook-optics-oida13-slides.pptx), there can be as high as a 1000:1 ratio between intra-data centre traffic to external traffic over the Internet based on a single simple request. Within data centre's 90% of the traffic inside data centres is intra-cluster.

At the same time as requiring an effective yet scalable way of interconnecting data centres and warehouse scale computers (WSCs), both internally and to each other, operators must provide a significant portion of data centre and WSC applications free of charge to users and consumers, e.g. Internet browsing, searching, etc. Accordingly, data centre operators must meet exponentially increasing demands for bandwidth without dramatically increasing the cost and power of the infrastructure. At the same time consumers' expectations of download/upload speeds and latency in accessing content provide additional pressure.

Historically microprocessor improvements from 1984-2004 were driven through increasing clock speeds as processor speeds increased from 20 MHz to 3 GHz. Subsequently processor speeds have typically maintained in the 2.5-4 GHz range and many microprocessor manufacturers have stated that circuit speeds are unlikely to exceed 5 GHz as both static and dynamic power dissipation considerably increase for deep sub-100 nm CMOS. Already, an Intel™ Core™ i7-5960X desktop processor with 8 cores operating up to 3.5 GHz with 20 MB cache consumes up to 140 W and an Intel™ Xeon Phi™ 7120X server coprocessor with 61 cores operating up to 1.2 GHz with 16 GB cache memory consumes 300 W. Such multi-core processors have therefore driven performance enhancements of the period 2004-2104. However, in many-core architectures, the overall performance of the computing system depends not only on the capabilities of the processing nodes but also the electrical interconnection networks carrying the communications between processors and between processors and memories.

Already optical interconnection solutions play critical roles in data centre operations for the interconnection of servers, hard drives, routers etc., where the goal is to move data as fast as possible with the lowest latency, the lowest cost and the smallest space consumption on the server blade. Gigabit Ethernet is too slow and 10 Gb/s solutions such as 10G Ethernet and Fibre Channel are deployed whilst 10/20 Gb/s Fibre Channel and 40G/100G Ethernet are emerging based upon multiple 10 Gb/s channels run over parallel multimode optical fiber cables or wavelength division multiplexed (WDM) onto a singlemode fiber. Intra-rack and local inter-server communications typically exploit 100GBASE-SR10 links with OM3/OM4 multimode optical fibers providing 100 m/150 m reach. General inter-server communications within a data centre that can be a few thousand meters and hence 100GBASE-LR4 singlemode optical fiber links with reach up to 10 km may be employed. Today, in addition to addressing such link speed enhancements, focus is being made to the architectures employed within the data centre in order to reduce latency and ease physical implementation where tens of thousands of fiber optic cables may be run within the data centre. Today the largest data centres comprise 50,000 to 100,000 servers.

However, within the server the electrical interconnection networks also suffer issues when scaling to a large number of processors due to the server level interconnections albeit differing in several aspects. Simple topologies, such as a chip-global bus, exhibit high latency, require power-hungry repeaters, and occupy large footprint. More complex topologies can be exploited, such as direct networks for example, which connect neighbouring processing nodes within a predetermined topology through point-to-point dedicated links. Still, these networks just like the spline-leaf networks connecting servers require the signal to cross multiple hops for connecting distant cores and are prone to contention between concurrent message transmissions, both leading to increased latency and power consumption. Accordingly, providing additional bandwidth for inter-circuit, intra-board, and inter-board applications just as with server connections will require the adoption of optical communication solutions. Accordingly, these will require the provisioning of low cost, small footprint, and low power solutions in order to meet the requirements of the applications and ongoing market drivers. Accordingly integrated optoelectronic solutions offer a technology option addressing these requirements.

Within the prior art, optical solutions to address and overcome the issues of superseding/replacing electrical interconnection networks have generally exploited some form of optical space switching. Such optical space switching architectures required multiple switching elements, leading to increased power consumption and footprint issues. Accordingly, it would be beneficial for new optical, e.g. fiber optic or integrated optical, interconnection architectures to address the traditional hierarchal time-division multiplexed (TDM) space based routing and interconnection to provide reduced latency, increased flexibility, lower cost, and lower power consumption.

In order to address this, the inventors exploit multiple domains by overlaying mode division multiplexing to provide increased throughput in bus, point-to-point networks, and multi-cast networks, for example, discretely or in combination with wavelength division multiplexing. Further, routing within networks according to embodiments of the invention may be based upon space switching, wavelength domain switching, and mode division switching or combinations thereof. In this manner the inventors provide interconnections exploiting N×W×M×D Gb/s photonic interconnects wherein N channels are provided each carrying W wavelength division signals with M modes each at D Gb/s.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to optical interconnection networks and more particularly to circuit board level, interchip, and intrachip optical interconnections and networks.

In accordance with an embodiment of the invention there is provided an optical node comprising:
an input port coupled to a first optical link supporting a plurality of wavelengths and plurality of transverse modes;
an output port coupled to a second optical link supporting a plurality of wavelengths and a plurality of transverse modes;
a third optical link coupled to the input port and the output port supporting the plurality of wavelengths and the plurality of transverse modes;
at least one of:
  an optical transmitter block coupled to the third optical link for launching at the output port a generated optical signal at a predetermined wavelength of the plurality of wavelengths and a predetermined transverse mode of the plurality of transverse modes for transmission; and
  an optical receiver block coupled to the third optical link for extracting a received optical signal from the input port at a predetermined wavelength of the plurality of wavelengths and a predetermined transverse mode of the plurality of transverse modes.

In accordance with an embodiment of the invention there is provided a method of transmitting data encoded onto an optical signal by selectively exciting a predetermined mode of a plurality of modes within an optical waveguide.

In accordance with an embodiment of the invention there is provided a method of transmitting data encoded onto an optical signal by selectively coupling the transmitter to an optical waveguide in order to excite a predetermined mode of a plurality of modes within an optical waveguide.

In accordance with an embodiment of the invention there is provided a method of receiving data encoded onto an optical signal by selectively at least one of filtering and coupling a predetermined mode to a photodetector, the predetermined mode being one of a plurality of modes supported by the optical waveguide.

In accordance with an embodiment of the invention there is provided a system comprising:
a plurality of transmitters, each transmitter generating an encoded optical signal;
an optical waveguide based network comprising optical waveguide supporting a plurality of optical modes;
a plurality of first mode filters, each first mode filter of the plurality of first mode filters for coupling the output of a predetermined transmitter of the plurality of transmitters to a predetermined optical mode of the plurality of optical modes supported by the optical waveguide;
a plurality of second mode filters, each second mode filter of the plurality of second mode filters for coupling a predetermined optical mode of the plurality of optical modes supported by the optical waveguide to an optical photodetector.

In accordance with an embodiment of the invention there is provided a method of transmitting data by encoding parallel data onto a plurality of optical signals generated from a single optical emitter and then coupling each optical signal of the plurality of optical signals to a predetermined mode of a plurality of modes supported by an optical waveguide.

In accordance with an embodiment of the invention there is provided a method of receiving parallel data by filtering parallel data encoded onto a plurality of modes supported by an optical waveguide to a plurality of photodetectors, each photodetector receiving the data encoded onto a predetermined mode of the plurality of modes.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
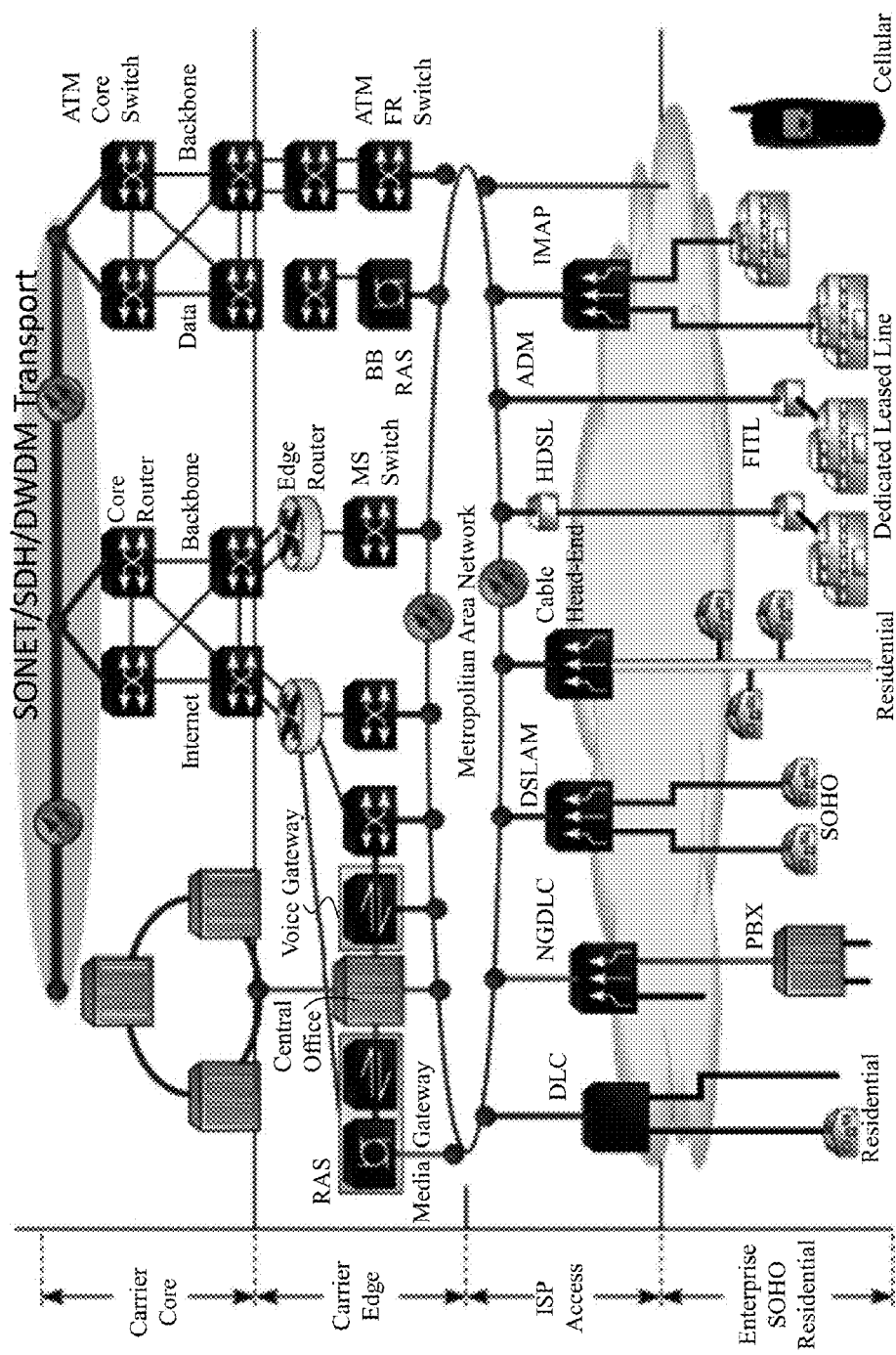
FIG. 1A depicts the deployment of optical networking and optical interconnections within the global telecommunications architecture.

The present invention is directed to optical interconnection networks and more particularly to circuit board level, interchip, and intrachip optical interconnections and networks.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "tunable laser" as used herein, and throughout this disclosure, refers to a laser whose wavelength of operation can be altered in a controlled manner. This includes, but is not limited to, lasers where the optical length of the cavity can be modified and thus continuously tuned over a wavelength range. Such lasers include distributed feedback (DFB) semiconductor lasers, vertical cavity surface emitting lasers (VCSELs), temperature tuned lasers, MEMS based external cavity lasers (ECLs), multiple prism grating ECLs, tunable VSCELs, and DFB laser arrays.

An "external modulator" as used herein, and throughout this disclosure, refers to a device employed to modulate an optical signal, typically within an optical waveguide. This includes, but is not limited to, external modulators that exploit absorption by varying a materials absorption coefficient or refraction by varying the refractive index of a material. Absorption based external modulators may exploit, for example, the Franz-Keldysh effect, quantum confined Stark effect, excitonic excitation, Fermi level changes, or changes in the free carrier concentration. Refractive modulators typically exploit the electro-optic effect within a Mach-Zehnder interferometer.

A "mode" as used herein and throughout this disclosure, refers to the configuration of the electromagnetic radiation supported by a medium which has been structure such that the section is invariant by translation along the direction of propagation of the said "mode". This includes, but is not limited to, modes of electromagnetic radiation within the visible to near-infrared regions of the electromagnetic spectrum confined to a waveguide.

A "wavelength filter" as used herein, and throughout this disclosure refers to a flexible, optical device that selectively transmits optical signals over a predetermined wavelength range. This includes, but is not limited to, fixed dichroic filters, tunable Fabry-Perot resonator filters, liquid crystal tunable filter, MEMS based tunable filters, and tilting grating tunable filters.

A "mode filter" as used herein, and throughout this disclosure, refers to an optical device which selectively filters a mode from the plurality of modes within an optical waveguide or optical fiber. This includes, but is not limited to, mode filters that couple through free space optics to a subsequent optical device, fixed mode filters that couple from a multimode optical waveguide to a singlemode optical waveguide, tunable mode filters that couple a selected mode from the plurality of modes within a multimode optical waveguide to a singlemode optical waveguide, fixed mode filters that couple from a singlemode optical waveguide to a multimode optical waveguide, tunable mode filters that couple a singlemode optical waveguide to a selected mode from the plurality of modes within a multimode optical waveguide, a ring resonator filter, coupled rings resonator filter, a directional coupler, a tunable directional coupler, a multimode interference filter, a tunable multimode interference filter, a photonic crystal filter, and nanostructure based filters. Such mode filters may include mode filters for selectively coupling modes laterally and/or vertically to different modes of an optical waveguide.

An "optical waveguide" as used herein, and throughout this disclosure refers to a dielectric medium or combination of medium invariant per translation along the direction of propagation, supporting the propagation of optical signals within a predetermined wavelength range formed. An optical waveguide may be an isolated structure comprising at least a core and a cladding, e.g. an optical fiber, or it may be formed as part of a carrier, or formed within a substrate, e.g. a planar lightwave circuits, an integrated optical devices, or an optical waveguide. This includes, but is not limited to, flexible optical waveguides formed from extruded glass, extruded doped silica, extruded chalcogenide glasses, and polymer. This includes, but is not limited to, optical waveguides formed within AlGaAs—GaAs material systems, InGaAsP—InP material systems, ion-exchanged glass, ion-exchanged ferroelectric materials (e.g. proton exchanged LiNbO3), doped ferroelectric materials (e.g. titanium doped lithium niobate), silica-on-insulator, silica-on-silicon, doped silicon, ion implanted silicon, polymer on silicon, silicon oxynitride on silicon, polymer on silicon, Silicon-On-Isolator (SOI) and polymer on polymer.

An "optical fiber" as used herein, and throughout this disclosure refers to a flexible optical waveguide which due to its transparency over a predetermined wavelength range transmits optical signals. This includes, but is not limited to, step-index optical fibers, graded-index optical fibers, silica optical fibers, chalcogenide glass optical fibers, and polymer optical fibers. Such optical fibers may be multimode supporting multiple modes. Such optical fibers may be circular thereby supporting multiple modes that are laterally/vertically/radially symmetric modes, rectangular supporting multiple modes laterally but singlemode in vertically, rectangular supporting multiple modes laterally with limited modes vertically (e.g. 2-5), as well as waveguides with similar or other cross-sections. Such optical fibers may be discrete, in ribbon format assembled from discrete optical fibers with discrete claddings per optical fiber, in ribbon format with common cladding between optical fibers, optical fibers embedded in a polymer flexible film, and optical fibers attached to a polymer flexible film.

A "receiver" as used herein, and throughout this disclosure, refers to a device that converts received optical signals to electrical signals. This includes, but is not limited to, discrete photodetectors, photodetectors with electrical amplification, photodetectors with electrical gain and logic generation circuits, p-n photodiodes, p-i-n photodiodes, avalanche photodiodes, and metal-semiconductor-metal photo detectors.

Referring to FIG. 1, there is depicted the deployment of optical networking and optical interconnections within the global telecommunications architecture. According at the highest layer there are SONET/SDH/DWDM long-haul and ultra-long-haul transport networks exploiting 40/80 or more channels of dense wavelength division multiplexed (DWDM) transmission at 2.5 Gbs/10 Gbs or more per fiber. Coupled to the transport layer within the carrier core are high speed, high port count, high reliability elements supporting the carrier backbone (e.g. time sensitive telephony), data, and Internet traffic together with core routers and asynchronous transfer mode (ATM) core switches which groom traffic for the transport networks and route data/telephony/Internet traffic etc. down/up from the carrier edge. At the same time the carrier core exploits optical fiber based interconnections for the central offices distributed across the carrier's territory.

Within the carrier edge a range of devices are connected via edge routers to the carrier core and to the metropolitan area networks (MAN) serving communities, business districts etc. Such elements include media gateways, voice gateways, central offices, managed switches (MS), broadband (BB) remote access servers (RAS), ATM frame relay (FR) switches, RAS, etc. Such elements groom data for the MAN from the carrier core and similarly route data from the MAN to the carrier core and transport. Below the MAN are layers of Internet service provider (ISP) access and then Enterprise/small office-home office (SOHO)/Residential access. The former is achieved through a variety of functional blocks coupled to the MAN via optical fiber links including digital loop carrier (DLC), digital subscriber line access multiplexers (DSLAM), cable TV (CATV) headends, add-drop multiplexers (ADM), and Internet Message Access Protocol (IMAP). Within the Enterprise/SOHO/Residential access optical fiber typically penetrates through dedicated leased lines although a variety of Fiber-to-the Home/Curb/Box architectures bring optical fiber into the so-called "last mile" to the consumer.

Disposed at different levels within this architecture the servers supporting the provisioning of Internet data are distributed together with the data centres. These are typically connected to the transport layer directly and service national data distribution as well as connecting multiple regional/provincial/state data centres together to support more localized traffic management, content storage, data replication etc. Accordingly, as noted supra a single request from a user on a residential CATV network is routed, typically, optically from the cable head end to the MAN and therein via routers and switches with optical interconnections to local servers and therein through the carrier core networks to the data centres wherein the appropriate transfer of data back to the user occurs. With optical interconnection within the data centre the optical interface is on the server and may as noted previously trigger hundreds of other server-server requests and data transfers including long haul and ultra-long haul links.

Figure 1B:
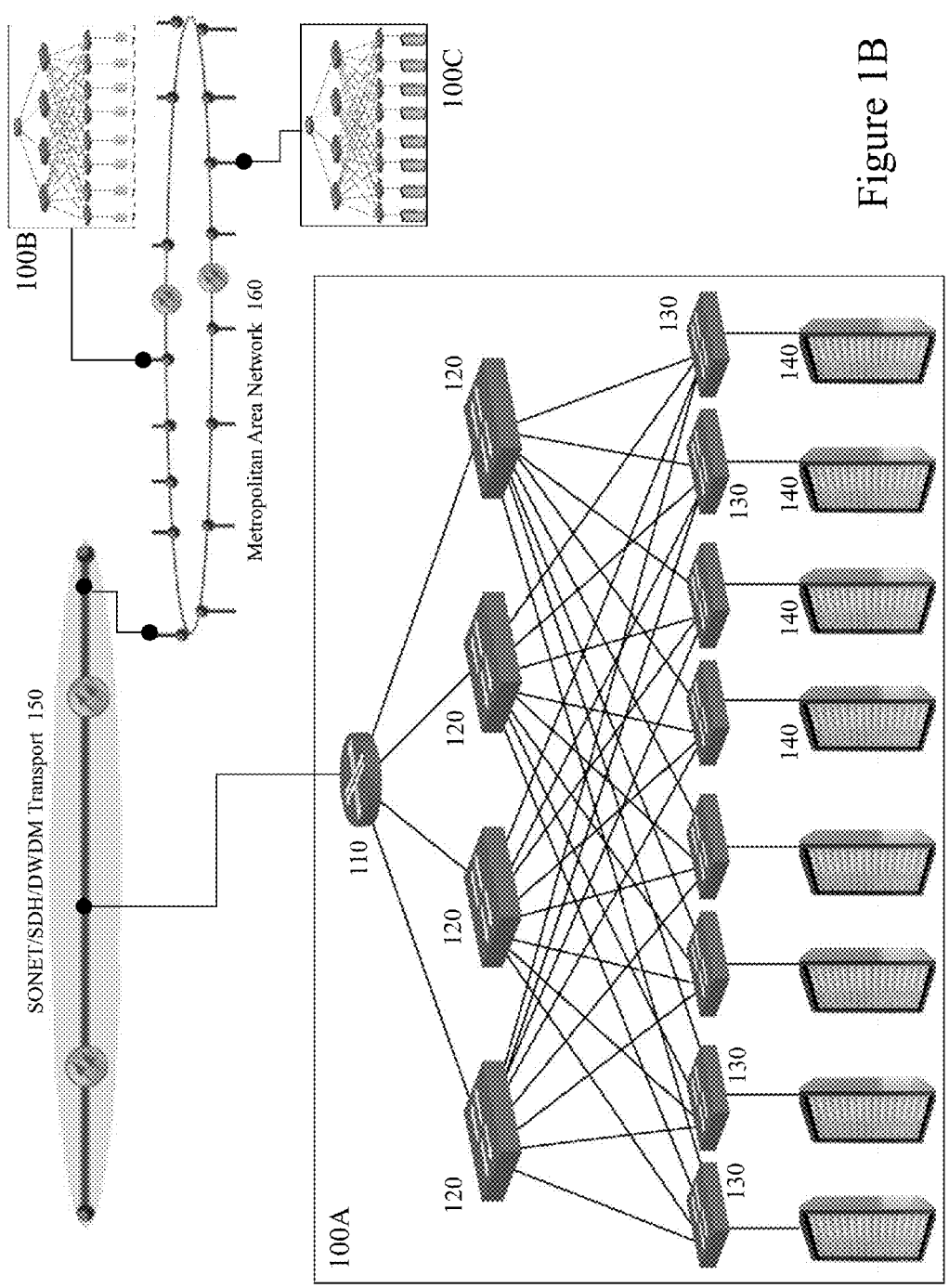
FIG. 1B depicts a typical prior art leaf-spine architecture for interconnecting servers within a data centre and data centres to each other.

Now referring to FIG. 1B there is depicted a typical prior art leaf-spine architecture for interconnecting servers within a data centre according to the prior art. As depicted first data centre 100A is connected directly to SONET/SDH/DWDM Transport 150 whilst second and third data centres 100B and 100C are each connected to Metropolitan Area Network 160 and therein to SONET/SDH/DWDM Transport 160. Within each data centre, for example first to third data centre 100A to 100C, a router 110 that connects the spine switches 120 to the network, e.g. SONET/SDH/DWDM Transport 150 in the instance of first data centre 100A and Metropolitan Area Network 160 in the instance of the second and third data centres 100B and 100C. Each spine switch 120 is connected to a plurality of leaf switches 130 and therein to a server rack or server racks 140. Within a typical exemplary embodiment each shelf within rack is a two rack unit (2RU) bay supporting a server or servers with a pair of 10 Gb/s Ethernet connections to the leaf switch 130. With typically 10 shelves per rack then each leaf switch receives and transmits 20×10 Gb/s=200 Gb/s of data to/from the server rack 140. Each leaf switch 130 is connected within the embodiment depicted to a number of spine switches 120 wherein typically the links from each leaf switch 130 to each spine switch 120 are partitioned either according to the number of spine switches 120 to which the leaf switch is connected and their interconnections or asymmetrically according to predetermined rules and storage rules associating like data to closely associated servers, for example.

Figure 8:
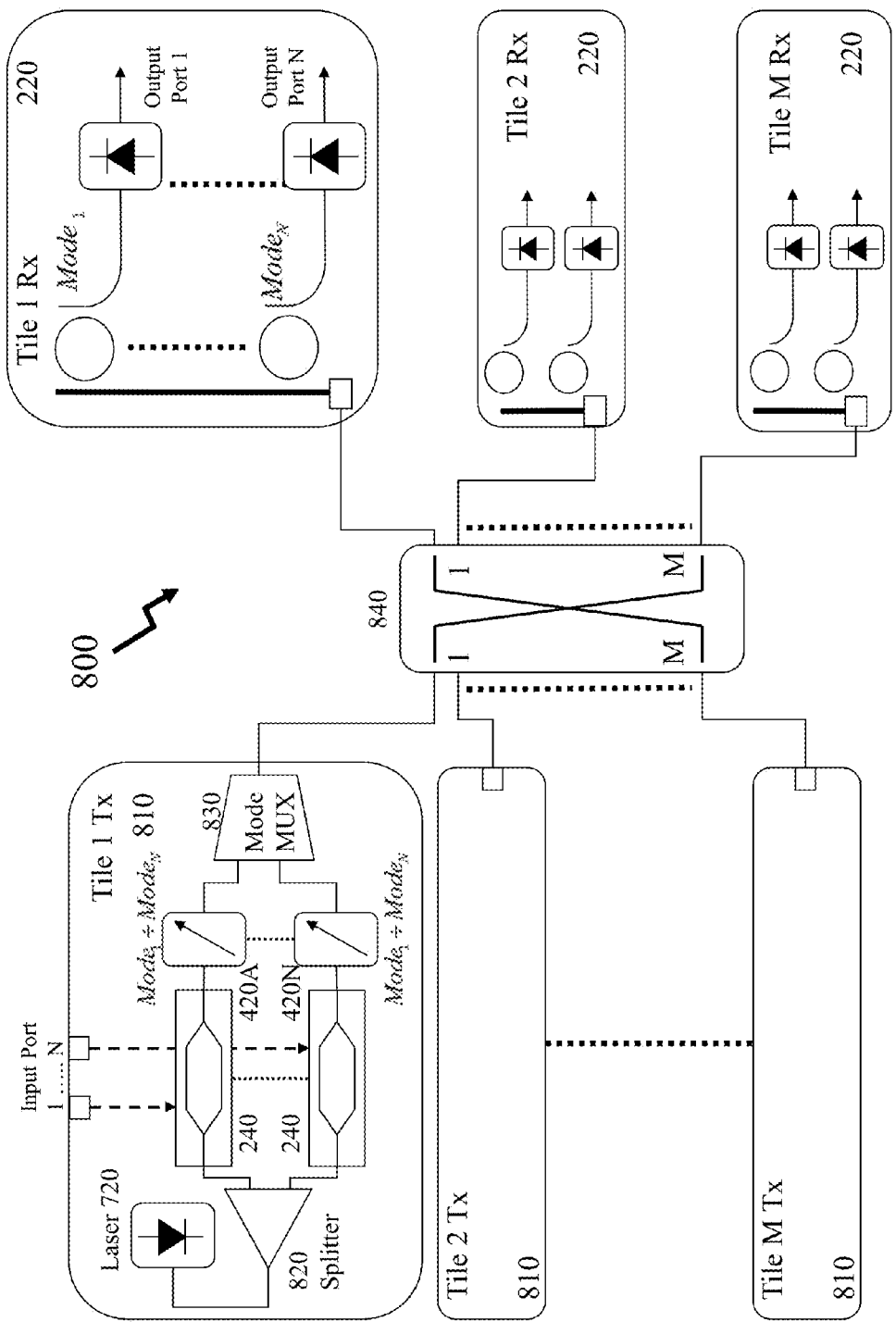
FIG. 8 depicts a matrix architecture according to an embodiment of the invention exploiting mode and wavelength dual domain division multiplexing via fixed wavelength tunable mode transmitters with wavelength selective receivers.

For example, as depicted in FIG. 1B 8 server racks 140 with 160 server nodes overall supporting 10 Gb/s Ethernet each may be connected to 4 leaf switches 130. Accordingly, the server rack 140-leaf switch 120 connection is 200 Gb/s upstream/downstream, as noted above implemented through 20×10 Gb/s, which are then connected to the 4 spine switches 120 wherein each leaf switch 130-spine switch 120 may be implemented to support 4×50 Gb/s=200 Gb/s for example such that each spine switch 120 is connected to each spine switch 120 with a 50 Gb/s link. Alternatively, a leaf switch 130 may be connected to asymmetrically to the spline switches 130 such that a "nearest neighbour" spline switch 120 is coupled at 80 Gb/s and the remaining 3 spline switches 120 connected with 40 Gb/s. Alternatively, a "nearest neighbour" may be connected at 100 Gb/s, a pair of "next nearest neighbours" at 40 Gb/s and the fourth spline switch 120 at 20 Gb/s.

FIG. 1B depicts a full Clos network interconnection between the spline switches 120 and the leaf switches 130 implemented such that every spine switch 120 is connected to every leaf switch. Historically, partial Clos networks were implemented due to the costs and complexity of the cabling interconnections but have increased latency and hence a tradeoff made within data centres of cost/complexity and latency. However, it would be evident that server to server connectivity within a server rack 140 is still through a leaf switch 130 and between server racks 140 through a pair of leaf switches 130 and spine switch 120. However, as noted above, absent increased data processing/handling capacity from the servers, increased data handling is today achieved through multi-server parallel processing and data centres continuously increasing in physical dimensions.

Figure 1C:
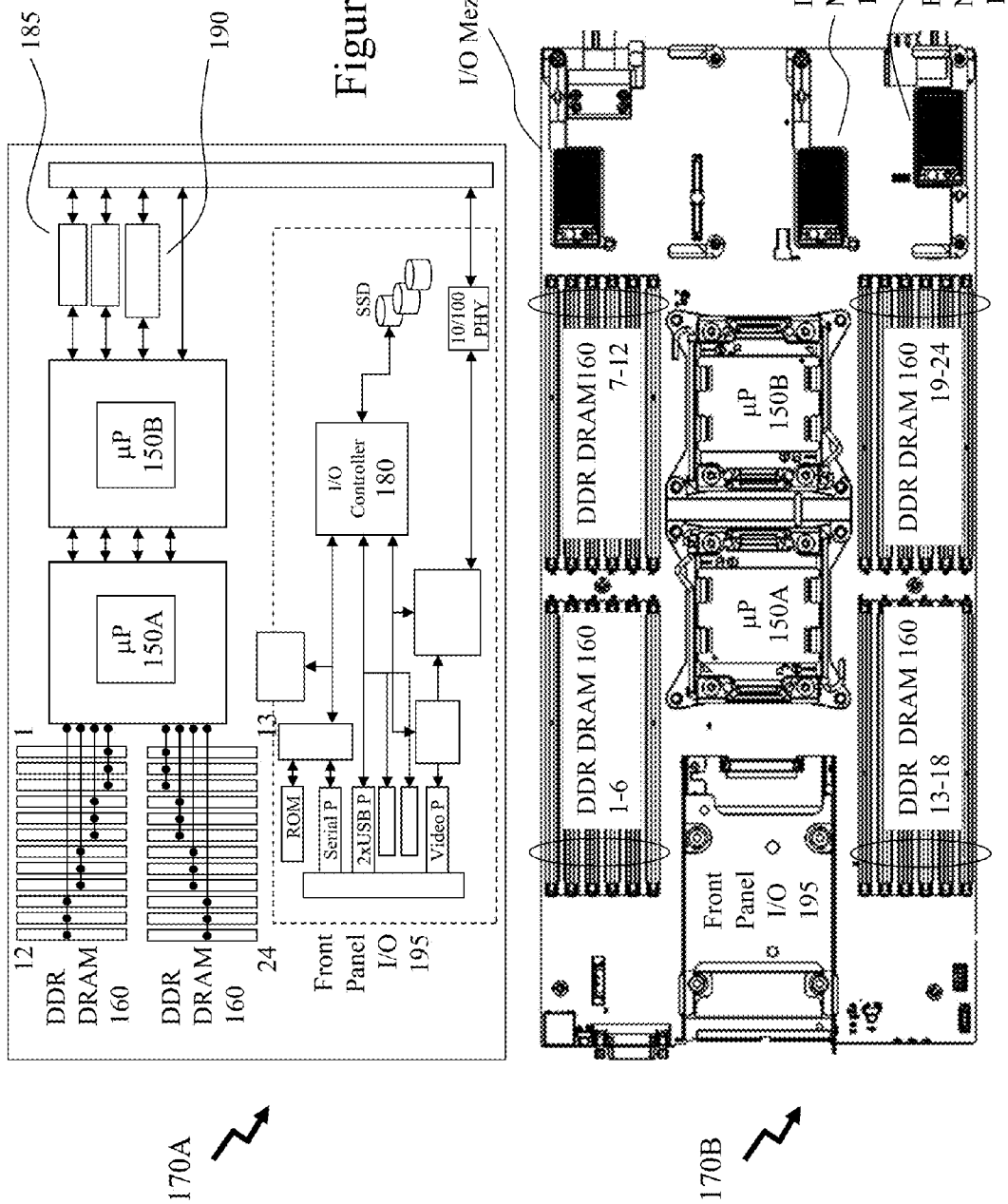
FIG. 1C depicts a typical prior art server blade architecture.

Now referring to FIG. 1C, there is depicted a server blade architecture within the prior art in first and second schematics 170A and 170B. Accordingly, the server blade comprises a first and a second microprocessors 150A and 150B which are directly coupled together as well as being coupled to I/O Controller 180. The first microprocessor 170A is coupled to twenty four Double Data Rate (DDR) synchronous Dynamic Random-Access Memory (DRAM) Dual In-Line Memory Modules (DIMM) 160 whereas the second microprocessor 150B is coupled to a pair of I/O mezzanine connectors 185 and an expansion node connector 190 wherein the mezzanine connectors are coupled to 10 Gb/s Ethernet interfaces (not shown for clarity) and the expansion coupler allows the server blade to an expansion node, which may for example, host twelve 2.5" hard disk drives (HDD) providing, for example, 14.4 TB. The twenty four DDR DRAM DIMM 160 modules may for example provide 384 GB of on-blade memory which may be increased to 768 GB with a load reduced DDR DRAM DIMM. Accordingly, it would be evident that as discussed supra replacing the 10 Gb/s Ethernet interface for the server blade with a 20 Gb/s or 40 Gb/s interface does not increase the capacity of the server blade as it is internally limited by the data buses internally such as those between the first microprocessor 150A and the 24 DDR DRAM 160 modules and second microprocessor 150B and expansion node controller 190 and the external HDD drives. Similarly, the other data buses of interest to increase the server blade performance include those from the first and the second microprocessors 150A and 150B respectively to the I/O Controller 180 and other Solid State Drives (SSDs) within the Front Panel I/O 195 block of the server blade.

As discussed above, multi-core processors are widespread and many core processors common within server applications. However, as noted before, the overall performance of a discrete computing system not only depends on the capabilities of the processing nodes, but relies more and more on the electrical interconnection network carrying the communication among processors and between processors and memories. Considering FIG. 1C, then such electrical interconnection "bottlenecks" included between the first and the second microprocessors 150A and 150B respectively, between first and second microprocessors 150A and 150B and I/O Controller 180, first and second microprocessors 150A and 150B and first to twenty four DDR DRAM 160, first and second microprocessors 150A and 150B and I/O Controller 180 to the expansion node 190 and the associated, for example, 12 2.5" HDD. Simple electrical topologies, such as a chip-global bus, exhibit high latency, require power-hungry repeaters, and occupy large footprint. More complex topologies can be then exploited, such as the direct networks, which connect neighbouring processing nodes in some fixed topology through point-to-point dedicated links Still, these networks require the signal to cross multiple hops for connecting distant cores and are prone to contention between concurrent message transmissions, both leading to increased latency and power consumption.

Accordingly, these elements may, according to embodiments of the invention, rather than being multiple discrete electrical interconnections connecting electrical components be part of a single optical network eliminating multiple hops between interconnect/device and allowing interconnection of elements directly through the optical network. Beneficially, such an optical interconnection network offers significant additional bandwidth and latency reduction within the requirement for high speed electrical switching and/or routing devices. Architecturally the same transmitter and receiver devices, as will be evident from embodiments of the invention below, may be exploited in linear bus, bus/ring, and cross-connect/matrix architectures as well as designs allowing partitioning such that, for example, memories are accessed with single channels but microprocessors can be dynamically addressed with 2, 4, 8, or more channels according to processor requirements. Similarly, the more recent server leaf-spine architectures such as that depicted in FIG. 1B, can be replaced with a fully connected architecture such that a group of servers form nodes on an extended optical bus allowing direct server to server interconnection within a server rack or across a number of server racks whilst another node or nodes on the optical bus couples the optical bus to a higher network, e.g. replacing the spine switches, etc.

Embodiments of the invention exploit the propagation of optical signal through modes in an optical guiding medium, e.g. an optical fiber or an optical waveguide, as an additional domain to carry, route, and switch data in addition to the prior art networks exploiting time domain multiplexing for a single data stream and wavelength division multiplexing to information. These modes supported by an optical waveguide have the interesting property of being orthogonal, meaning that the information carried by a mode is not affected by another one even if the data is carried at the same wavelength. Accordingly, multiple modes at the same wavelength can be exploited to add transmission capacity and/or routing and/or network flexibility.

In one embodiment of the invention, a single-domain mode-based interconnection network, may be devised and implemented with multiple input ports and multiple output ports allowing the routing/distribution/switching of data from any input port to any output port by exploiting the propagation modes of the optical guiding medium rather than wavelength division multiplexing (WDM) techniques. Accordingly, an output port may be assigned a unique propagation mode, distinct from the other ports, and hence establishing an input with the same propagation mode and/or converting an established input allows the data to be routed to that output port. Within an exemplary implementation data packets to be routed are electronically stored in an ingress buffer at each input port with a scheduler controlling which data packets are to be transmitted to which output port and when. Once selected, a packet is optically transmitted to the output ports using the optical guiding medium along the mode corresponding to its destination port. Multiple packets can be multiplexed together (mode multiplexing) on the same transmission medium specifically designed to supports the transmitted modes, e.g. an optical fiber or an optical waveguide. Within this simple embodiment the number of output ports and accordingly the throughput of this single-domain mode-based interconnection network are limited by the number of propagation modes that can be supported by the multimode waveguide. In some guiding media, the number of modes can be a small number, e.g. 5-10, whilst in others the number of modes can be tens or hundreds to thousands.

In this case, the transmission medium can be conceived as a bus where all input ports transmit, and where each output port reads the related packets. An alternative solution requires to close the bus in a ring configuration, enabling all-to-all communication on both ring directions. Another embodiment of the invention is upon the joint exploitation of mode multiplexing and wavelength multiplexing leading to what the inventors refer to as a dual-domain interconnection network. The architecture may therefore consist of a plurality of cards (or tiles as referred to within this patent specification), each with multiple electrical input ports and multiple optical output ports although optionally the number of electrical input ports may provide a number of output ports through an electrical connection matrix such that there are more optical output ports than electrical input ports, more electrical input ports than optical output ports, or these may be equal and the electrical connection matrix allows reconfiguration of the association of an electrical input port to an optical output port. Implementations of this dual-domain interconnection network may therefore include bus, ring, space switched, and passive distributive networks: For example, where R=(N/2) each electrical input may be coupled to two optical outputs such that transmission to two other nodes is always performed to address latency/likely routing or typical data patterns for example. Optionally a single electrical input signal could be broadcast on all N outputs.

Wavelength-mode interconnection networks, according to embodiments of the invention, may be configured such that a tile (card) is assigned a unique wavelength distinct from the other tiles (cards). In each tile, each output port is assigned a unique mode, distinct from the other ports of the same tile. Switching of packets from any input port on any tile to any output port on any tile occurs by optically transmitting the packet data with the wavelength and the mode assigned to the packet' destination tile and port. For this purpose, a tunable transmitter is required at each input port. Also each input port requires a tunable mode selector or, in an alternative embodiment, a device (e.g., an electronic crosspoint) able to flexibly connect any transmitter with fixed mode generators. Based upon the uniqueness of each combination of wavelengths and modes, it is possible to multiplex the different packets' transmission (wavelength and mode multiplexing) on the same optical guiding medium (e.g., optical fiber or optical waveguide).

Mode-wavelength interconnection networks, according to embodiments of the invention, may be configured such that each tile is assigned a unique mode distinct from the other tiles. In each tile, each output port is assigned a unique wavelength, distinct from the other ports of the same tile. Switching of packets from any input port on any tile to any output port on any tile occurs by optical transmitting the packet data with the mode and the wavelength assigned to the packet' destination tile and port. Optionally, each input port enters an electronic cross-point switch able to flexibly connect them to the fixed-wavelength transmitters either discretely implemented or through a multi-wavelength laser. Alternatively, the driver circuit 250 may be removed and a multi-wavelength laser source and wavelength switches, such as multi-wavelength laser source 320 and wavelength switches 330A to 330N in FIG. 3 employed. Also, a tunable mode selector is required at each input port. Based upon the uniqueness of each combination of wavelengths and modes, it is possible to multiplex the different packets' transmission (wavelength and mode multiplexing) on the same optical guiding medium (e.g., optical fiber or optical waveguide).

Space-mode interconnection networks, according to embodiments of the invention, exploit an architecture wherein each port on a tile is addressed through a unique mode, and each tile is connected to a proper port of an optical space switch. Switching of packets from any input port on any tile to any output port on any tile occurs by optically transmitting the packet data with the mode assigned to the packet' destination port and properly steering each packet to the destination tile with an optical space switch. Each input port requires a tunable mode selector or, in an alternative embodiment, a device (e.g., an electronic cross-point) able to flexibly connect any transmitter with fixed mode generators. Based upon the uniqueness of each combination of paths and modes, it is possible to multiplex the different packets' transmission.

An even more scalable architecture is based on the joint exploitation of mode multiplexing, wavelength multiplexing and space multiplexing (or time multiplexing) leading to what the inventors refer to as triple-domain interconnection networks. Such an architecture, may for example, consist of C clusters of M tiles, each tile having R input ports and N output ports. Addressing to the proper cluster, tile, and port is achieved by exploiting (in possibly different order) mode, wavelength and space (or time) domains. While mode can be exploited to address a port and/or a tile, mode can also be exploited to make use of what the inventors refer to as a quad-domain interconnection network. In this, rather than serializing the data from an electronic circuit, parallel data is encoded in parallel onto multiple modes of a wavelength such that data is generated, transmitted, and received in parallel. By assigning time slots to ports such an approach may reduce the number of required lasers whilst maintaining high throughput.

Considering a multimode fiber then the number of supported modes is proportional to the square of the diameter core of the optical fiber, proportional to the numerical aperture (and therein the refractive index difference and cladding index), and inversely proportional to the wavelength. Accordingly, a silica graded index optical fiber with a refractive index of 1.452, with an index difference of 1%, operating at 1550 nm with a diameter of 50 µm supports several hundred modes in contrast to a silica graded index optical fiber with index difference <0.4% and a diameter of 8 µm which is single mode. Accordingly, adjusting the diameter and index contrast allows for fibers with a 10, 20, 40 modes to be implemented, for example.

Figure 2:
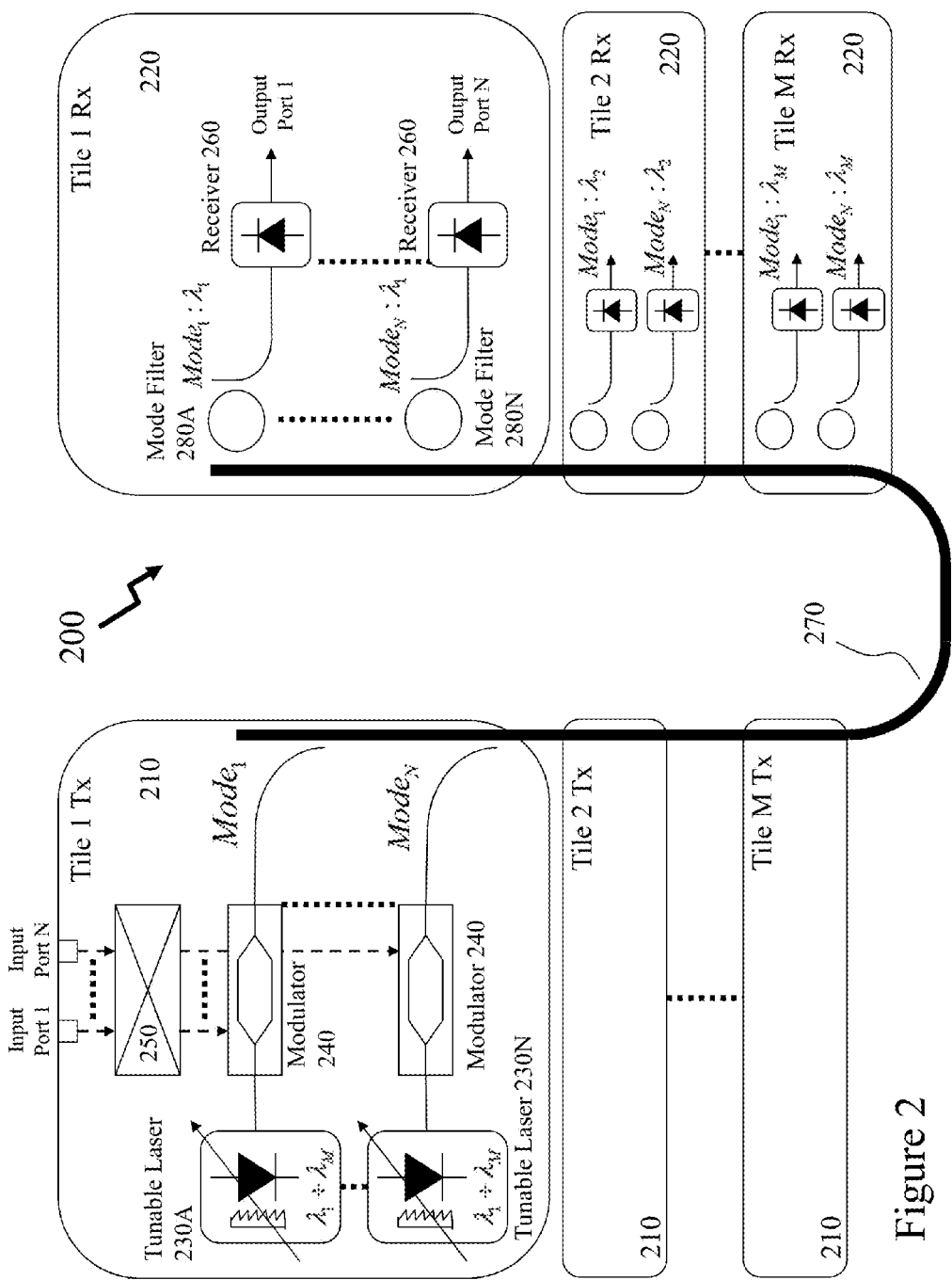
FIG. 2 depicts a bus/ring based architecture, according to an embodiment of the invention, exploiting wavelength and mode dual domain division multiplexing via tunable wavelength fixed mode transmitters.

Accordingly, referring to FIG. 2 there is depicted a bus/ring based architecture 200, according to an embodiment of the invention, exploiting wavelength and mode dual domain division multiplexing via tunable wavelength fixed mode transmitter tiles 210. As depicted, M transmitter tiles 210 are coupled to an optical bus 270 and therein to M receiver tiles 220. Each transmitter tile 210 comprises an array of N tunable lasers 230A to 230N which are each coupled to an external modulator 240. Each tunable laser 230 being tunable to one of M wavelengths, $\lambda_1, \ldots, \lambda_M$. Each of the N external modulators 240 is coupled to a driver circuit 250 which receives N input signals for transmission.

Driver circuit 250 may, for example, simply be an array of drivers to convert the digital data input to the appropriate voltages and/or currents to drive the external modulator 240. Alternatively, driver circuit 250 may include an electrical switching circuit to couple any input data port to any external modulator 240 or optionally may couple a single electrical input to a programmable number of modulators 240. The output of each external modulator 240 is coupled to the optical bus 270 to launch a different mode, $Mode_1 \ldots Mode_N$ onto the optical bus 270.

Subsequently coupled to the optical bus 270 are receiver tiles 220 wherein each receiver tile 220 comprises N mode filters intended to filter one of the modes $Mode_1 \ldots Mode_N$ at a predetermined wavelengths $\lambda_1, \ldots, \lambda_M$ that are supported by the optical bus 270 and transmitter tiles 210. Accordingly, receiver tile 1 Rx comprises N mode filters 280A to 280N intended to filter one of the modes $(Mode_1: \lambda_1); (Mode_2: \lambda_1); \ldots; (Mode_N: \lambda_1)$ from the optical bus 270 wherein in generalized form receiver tile K Rx filters $(Mode_1: \lambda_1); (Mode_2: \lambda_1); \ldots; (Mode_N: \lambda_1)$. Each of the N mode filters 280A to 280N is coupled to a receiver 260 wherein the optical signal is reconverted to the electrical domain.

Accordingly, a signal coupled to a transmitter tile $1 \leq J \leq M$ may be routed to a receiver tile K by setting one of the tunable lasers 240A ... 240N to the $K^{th}$ wavelength $\lambda_K$. The externally modulated optical signal is then mode converted to the $L^{th}$ mode based upon the selected tunable laser 240A to 240N, $1 \leq L \leq N$, for launch onto the optical bus 270 wherein it is subsequently filtered by the $L^{th}$ mode filter 280 on the $K^{th}$ receiver tile 220. Additional capacity between the $J^{th}$ transmitter tile 210 and the $K^{th}$ receiver tile 220 may be provided by also setting one or more other tunable lasers within the $J^{th}$ transmitter tile 210 to the $K^{th}$ wavelength $\lambda_K$ wherein these one or more other tunable lasers are coupled to other modes than the $L^{th}$ and hence may be simultaneously filtered from the signals on the optical bus 270 by the appropriate one or more mode filters 280.

In this manner, the architecture depicted in FIG. 2 allows for M transmitter tiles 210 to programmably, under external control, provide communications over optical bus 270 to M receiver tiles 220 in singlecast (one-to-one) as well as multicast (one-to-many) format. Further, the capacity for each link is programmable as multiple tunable lasers may be set to the same wavelength of a receiver tile. Accordingly, with M transmitter tiles 210 using N wavelengths to couple to N receiver tiles 220 and each external modulator supporting modulation at R Gb/s then the capacity of the bus and network is N×M×R Gb/s. It would be evident that the optical bus 270 may be closed to form a ring network as known in the art. Transmitter tiles 210 and receiver tiles 220 may be located together as with other prior art transceiver designs.

Figure 3:
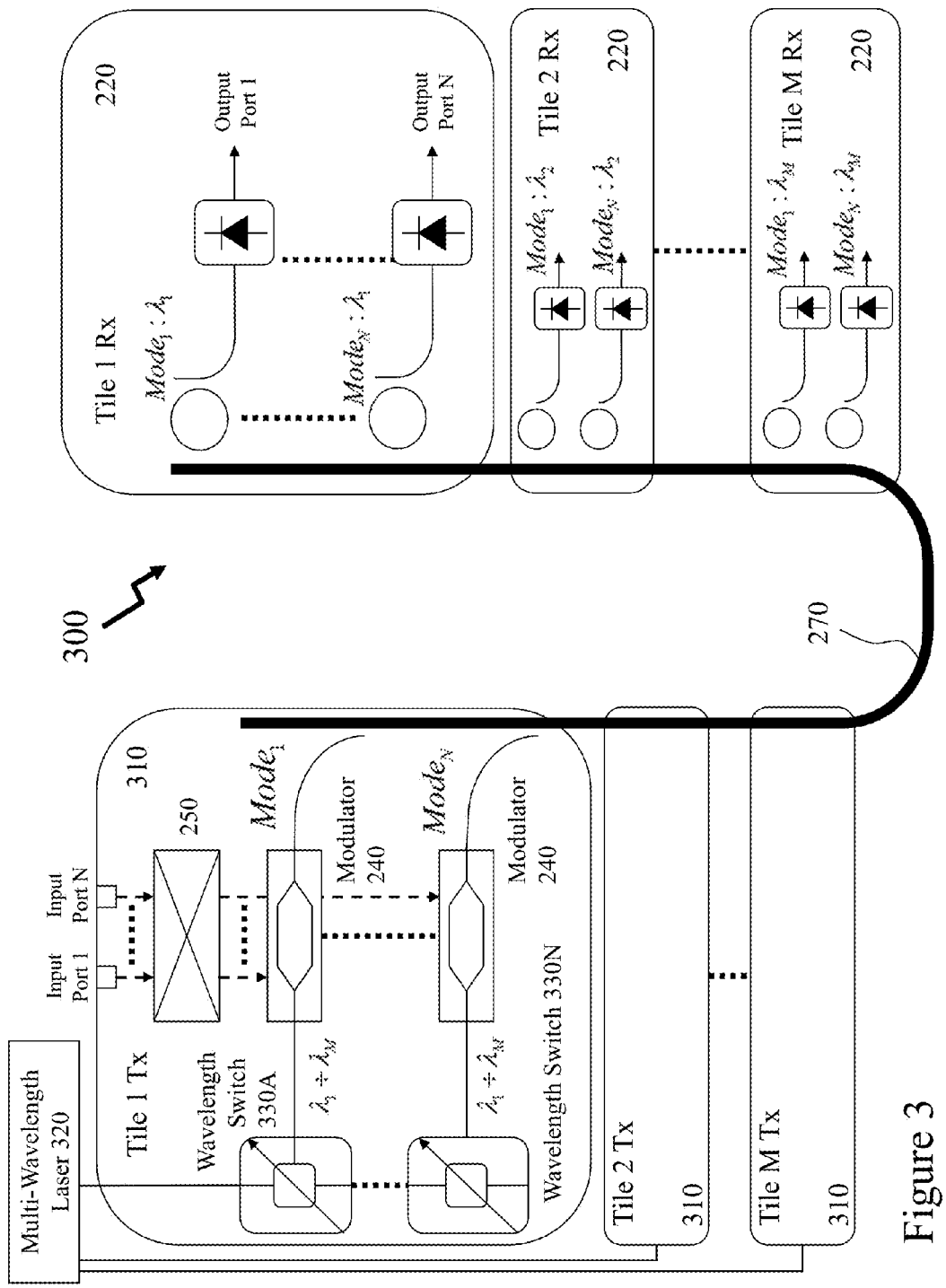
FIG. 3 depicts a bus/ring based architecture, according to an embodiment of the invention, exploiting wavelength and mode dual domain division multiplexing via wavelength selective fixed mode transmitters.

Now referring to FIG. 3, there is depicted a bus/ring based architecture 300, according to an embodiment of the invention, exploiting wavelength and mode dual domain division multiplexing wavelength selective tunable mode transmitter tiles 310 in combination with an optical bus 270 and a plurality M receiver tiles 220 such as described above in respect of FIG. 2. In contrast to the transmitter tiles 210 in FIG. 2 the array of N external modulators 240 within the transmitter tiles 310 are coupled to an array of wavelength selective switches 330A to 330N which are themselves coupled to a multi-wavelength laser 320. Accordingly, as each external modulator 240 within an array is associated with a predetermined mode $Mode_\alpha$ where $1 \leq \alpha \leq N$, its associated wavelength switch 330A allows the $Mode_\alpha$, from the transmitter tile 310, to be varied to one of the wavelength set $\lambda_1, \ldots, \lambda_M$ provided by the multi-wavelength laser 320 which has multiple outputs for the multiple transmitter tiles 310. Accordingly, whilst each transmitter tile 310 can select a receiver tile 220, through the appropriate selection of wavelength associated with the receiver tile 220, by a wavelength switch 330 within that transmitter tile 310, each receiver tile 220 can only be addressed with a single channel from that transmitter tile 310. Accordingly, the architecture depicted in FIG. 3 allows singlecast and multicast transmission from each transmitter tile 310 to each receiver tile 220 but with fixed link capacity as multiple external modulators 240 cannot access the same wavelength unlike the transmitter tiles 210 in FIG. 2.

However, if the wavelength switch 330 allowed for wavelength filtering without 100% routing then multiple wavelength switches 330 and external modulators 240 may be set to the same wavelength allowing multiple channels to be coupled to the same receiver tile 220. Such a wavelength switch 330 may, for example, be a tap coupler in combination with an optical amplifier and a tunable wavelength filter.

Figure 4:
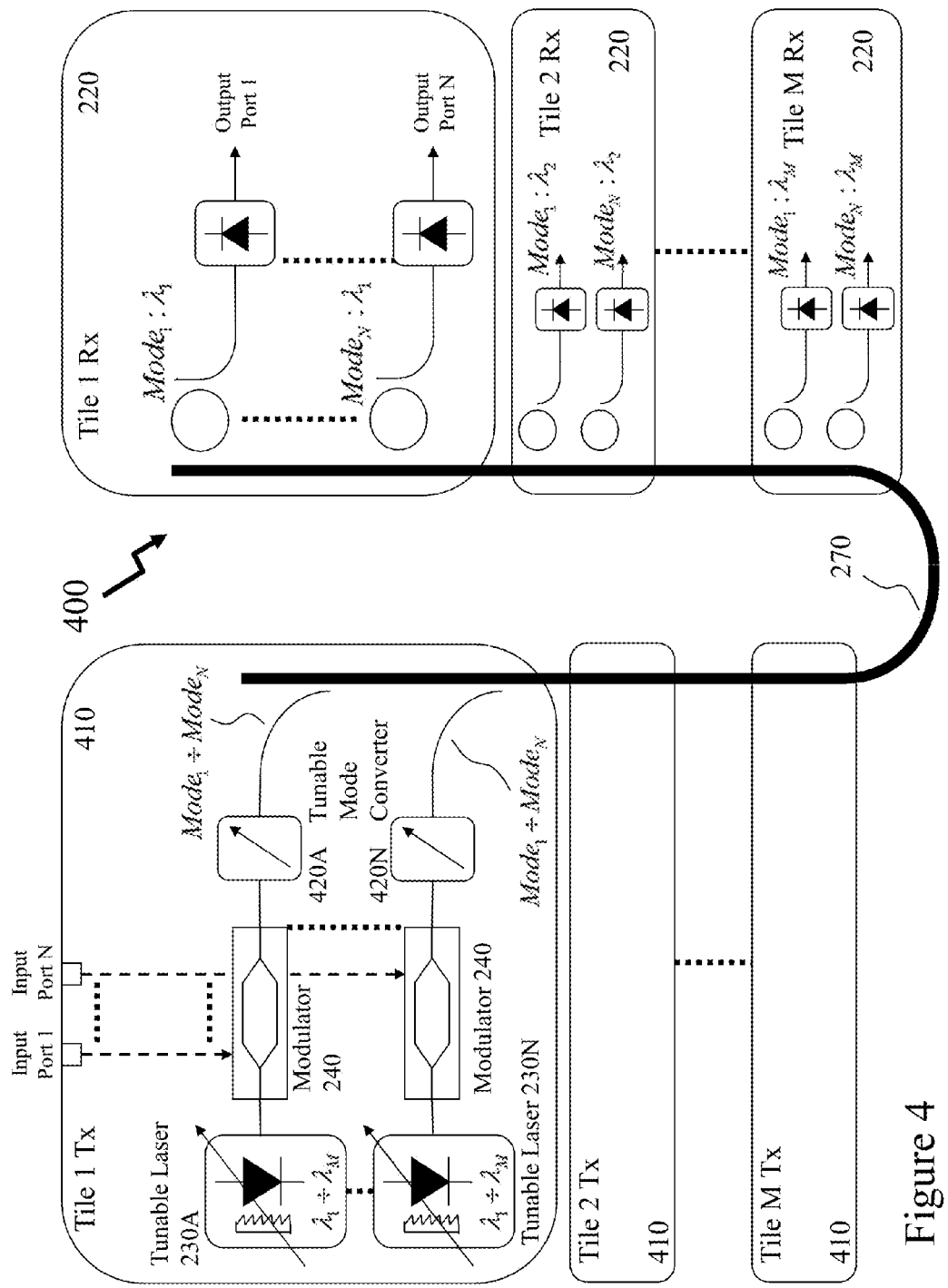
FIG. 4 depicts a bus/ring based architecture, according to an embodiment of the invention, exploiting wavelength and mode dual domain division multiplexing via tunable wavelength tunable mode transmitters.

Now referring to FIG. 4, there is depicted a bus/ring based architecture 400, according to an embodiment of the invention, exploiting wavelength and mode dual domain division multiplexing via tunable wavelength tunable mode transmitters tiles 410. Overall, the architecture 400 is similar to architectures 200 and 300 in FIGS. 2 and 3 except that the transmitter tiles 410 of architecture 400 now employ tunable mode converters 420 coupled to the outputs of the external modulators 240 that are themselves coupled to the outputs of tunable lasers 230. Accordingly, an optical path within a transmitter tile 410 comprising tunable laser 230, external modulator 240, and tunable mode filter 420 allows for each channel to be set both in mode and wavelength. In this manner the multicast and singlecast modes of transmission from each transmitter tile 410 are maintained but the routing constraints of the architecture 400 are more relaxed than that of architectures 200 and 300.

Figure 5:
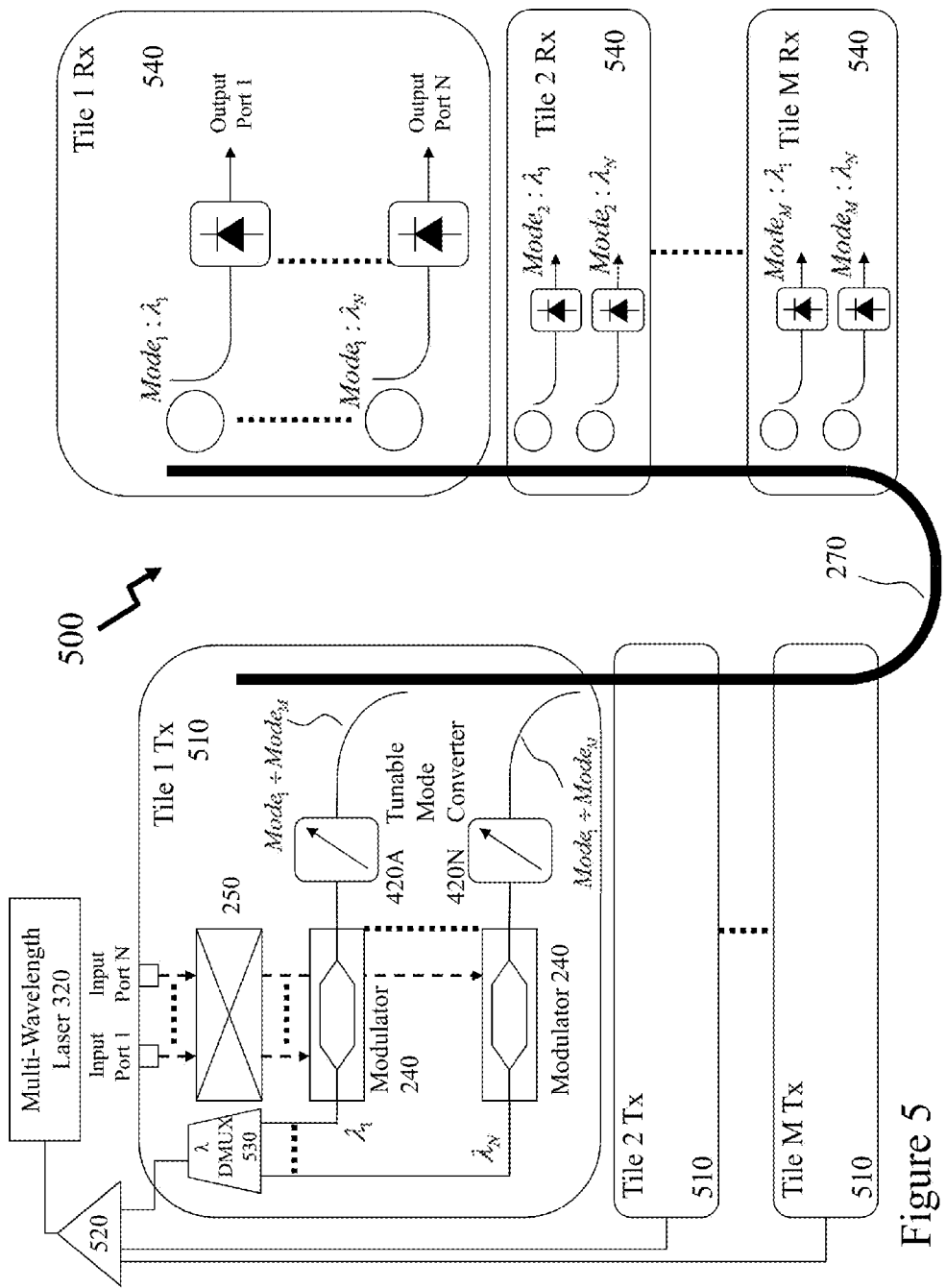
FIG. 5 depicts a bus/ring based architecture, according to an embodiment of the invention, exploiting mode and wavelength dual domain division multiplexing via fixed wavelength tunable mode transmitters.

Referring to FIG. 5, there is depicted a bus/ring based architecture 500, according to an embodiment of the invention, exploiting mode and wavelength dual domain division multiplexing via fixed wavelength tunable mode transmitter tiles 510. Accordingly, this architecture can be considered the dual of architectures 200 to 400. In this embodiment a plurality of M transmitter tiles 510 each with N wavelength channels communicate via an optical bus 270 to a plurality of M receiver tiles 540 each operating at a predetermined $Mode_X$ where $1 \leq X \leq M$ and supporting N different wavelength channels, each addressing a different output port in each receiver tile 540. Accordingly, mode filters 280A to 280N in architectures 200 to 400 are exploited arranged in a dual set-up, wherein each mode filter in a given receiver tile 540 is tailored to a specific mode. Modes are supported through the optical bus 270 and transmitted from the transmitter tiles 510. Each transmitter tile 510 is again coupled to a multi-wavelength laser 320 but, rather than an array of wavelength selective switches 330 as in architecture 300, the input from the wavelength laser 320, which is split by splitter 520 to all transmitter tiles 510, is coupled to a wavelength demultiplexer (DMUX) 530 such that each external modulator 240 is operating at a predetermined wavelength but its output is now switchable in output mode through the tunable mode converters 420 coupled to the output of each external modulator 240. Accordingly the selection of an external modulator 240 determines the receiver element in the receiver tile 220 to which the signal will be coupled.

Figure 6:
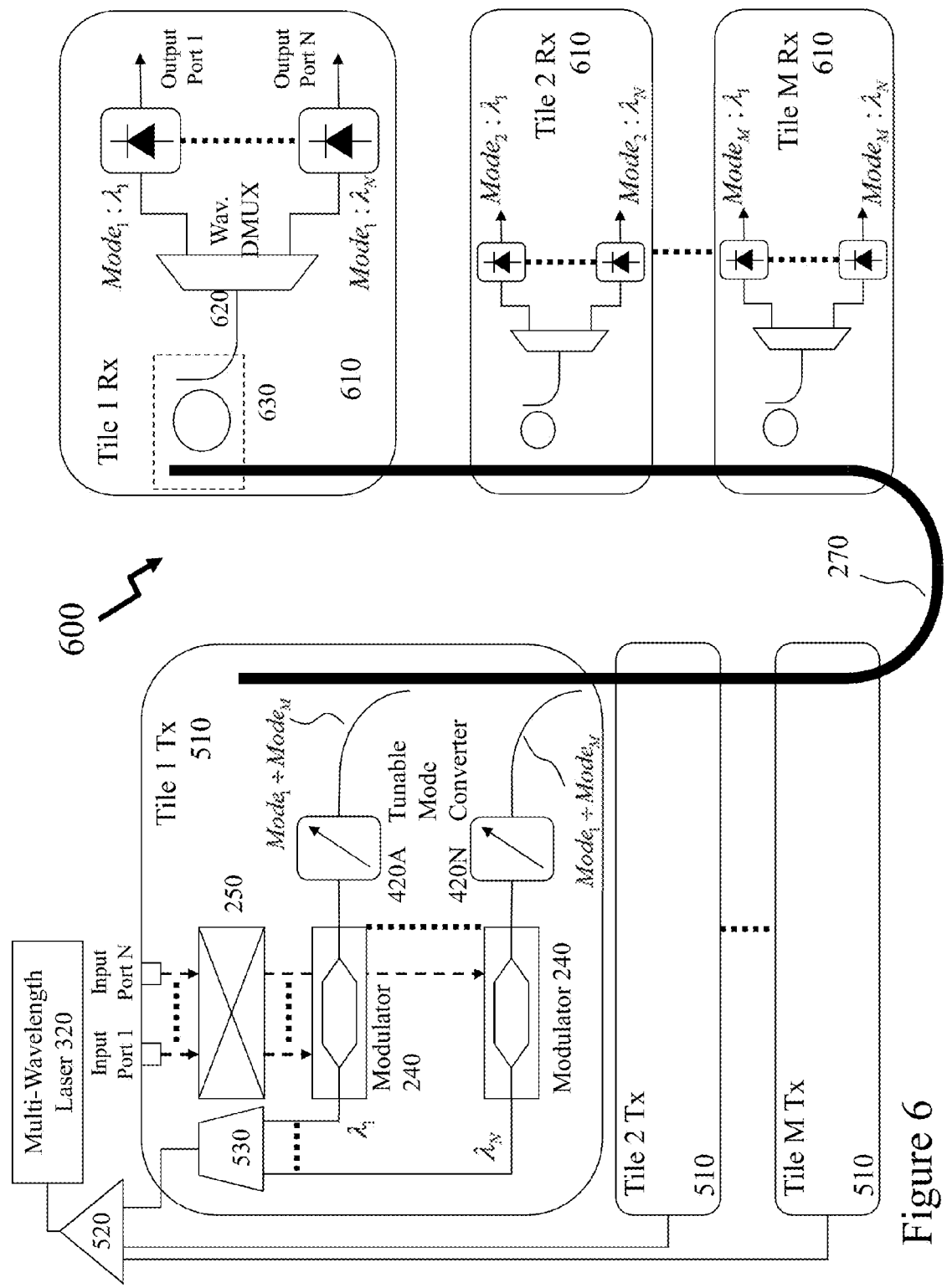
FIG. 6 depicts a bus/ring based architecture, according to an embodiment of the invention, exploiting mode and wavelength dual domain division multiplexing via fixed wavelength tunable mode transmitters and limited mode count receivers.

Now referring to FIG. 6, there is depicted a bus/ring based architecture 600, according to an embodiment of the invention, exploiting mode and wavelength dual domain division multiplexing via fixed wavelength tunable mode transmitters tiles 510 and limited mode count receivers tiles 610. Accordingly, as with architecture 500 each of the M transmitter tiles 510 can launch up to N wavelengths each adjustable in mode over M modes. However, now each receiver tile 610 comprises a broadband mode filter 630 filtering a single mode over a wide wavelength range, as opposed to mode filters 280A to 280N in architectures 200 to 500 wherein each mode filter of mode filters 280A to 280N is tailored to a specific mode at a specific wavelength, wherein each receiver tile 220 is wavelength specific or is tailored to a specific mode over a wide wavelength range to allow a generic receiver tile 220. It would be evident that other combinations may be provided such as splitting the wavelength range over 2 or more tiles according to the waveguide and mode filter characteristics such that 2 or more receiver tiles are employed. As such, the output of the mode filter 630 tailored to a specific mode $Mode_X$ where $1 \leq X \leq M$ is coupled to a wavelength DMUX 620 wherein each demultiplexed wavelength is then coupled to a receiver. Accordingly, a transmitter tile 510 can increase capacity to a receiver tile 610 by adding additional wavelengths through the setting of their tunable mode converters 420 to the $Mode_X$ of that receiver tile 610.

Figure 7:
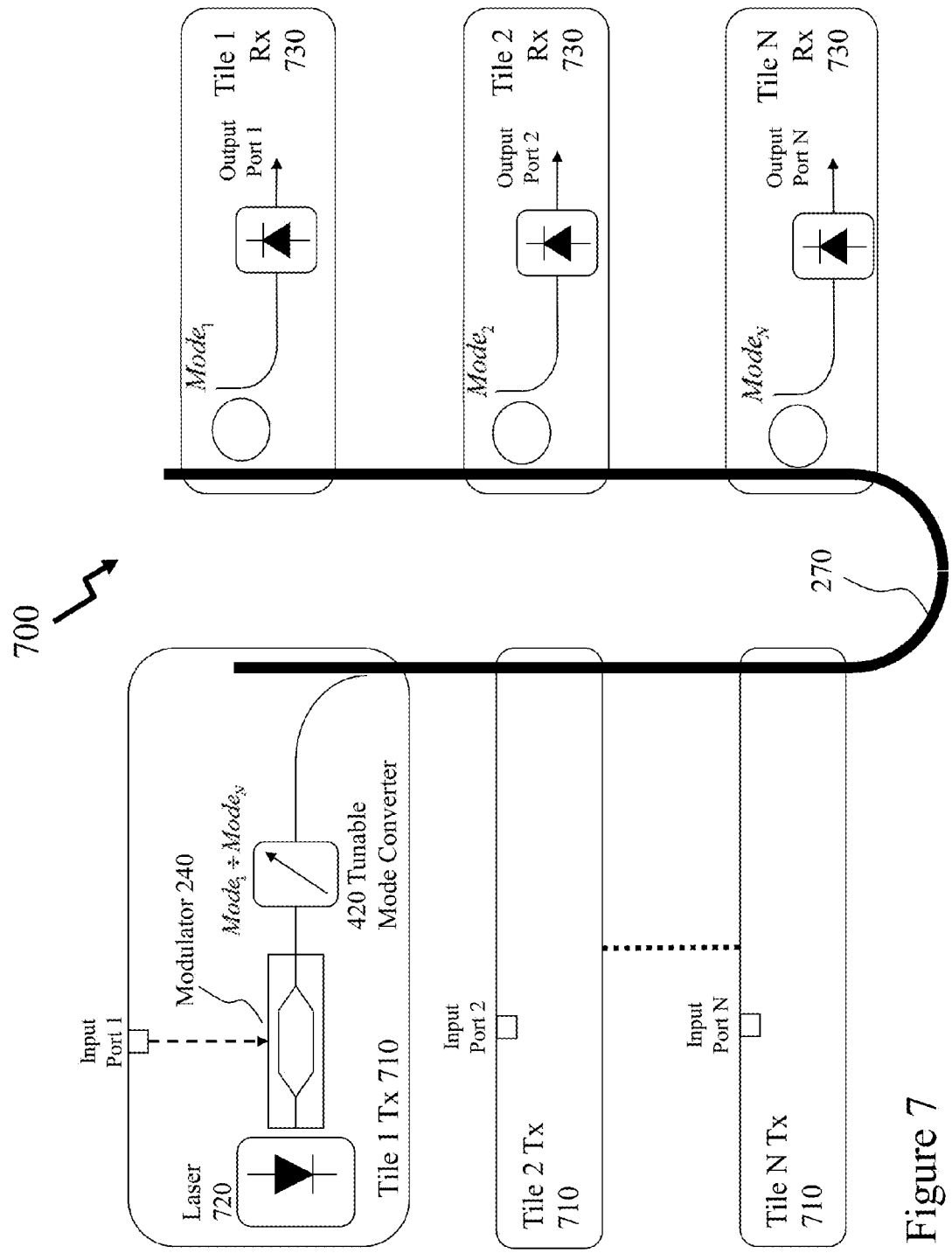
FIG. 7 depicts a bus/ring based architecture, according to an embodiment of the invention, exploiting mode domain division multiplexing via wavelength tunable mode transmitters.

Referring to FIG. 7, there is depicted a bus/ring based architecture 700, according to an embodiment of the invention, exploiting tunable mode transmitter tiles 710 and fixed mode receiver tiles 750 exploiting broadband single mode filter coupled to a receiver. The plurality of transmitter tiles 710 comprise a laser diode 720, external modulator 240, and tunable mode converter 420 such that the transmitter tile 710 is established transmitting a specific mode $Mode_X$ where $1 \leq X \leq N$. The outputs from the transmitter tiles 710 are coupled bus 270, which may form part of a ring, such that the output of each transmitter tile 710 is coupled to the intended receiver tiles 730. Accordingly, with all transmitter tiles 710 operating on different modes each transmitter tile 710 communicate to a receiver tile 730.

Now referring to FIG. 8, there is depicted a matrix architecture 800, according to an embodiment of the invention, exploiting space and mode dual domain division multiplexing via fixed wavelength tunable mode transmitter tiles 810 are employed in conjunction with receiver tiles 220 such as described above, in respect of FIG. 2, and comprises a plurality of N mode filters each coupling a specific mode $X=1 \leq Mode_X \leq X=N$ to a receiver. Each fixed wavelength tunable mode transmitter tile 810 comprises a laser 720 coupled to a plurality of external modulators 240 via splitter 820 wherein the output of each external modulator 240 is coupled to a tunable mode coupler 420 to couple the output of the external modulator 240 to a predetermined mode $X=1 \leq Mode_X \leq X=N$. The multiple modes from the tunable mode couplers 420A to 420N are coupled to the matrix interconnection 840 via a mode MUX 830. The matrix interconnection 840 provides wavelength independent distribution of each input packet coming from a mode-multiplexed matrix input to the mode multiplexed matrix outputs. Accordingly, the singlecast and multicast routing from the transmitter tile 810 is accommodated whilst dynamic channel bandwidth is supported by the number of parallel wavelength channels transmitted. Optionally, the tunable mode converters 820A to 820N may be replaced with fixed mode couplers provided that a driver circuit 250 is added to electrically cross-connect the N input ports and the N modulators 240.

Figure 9:
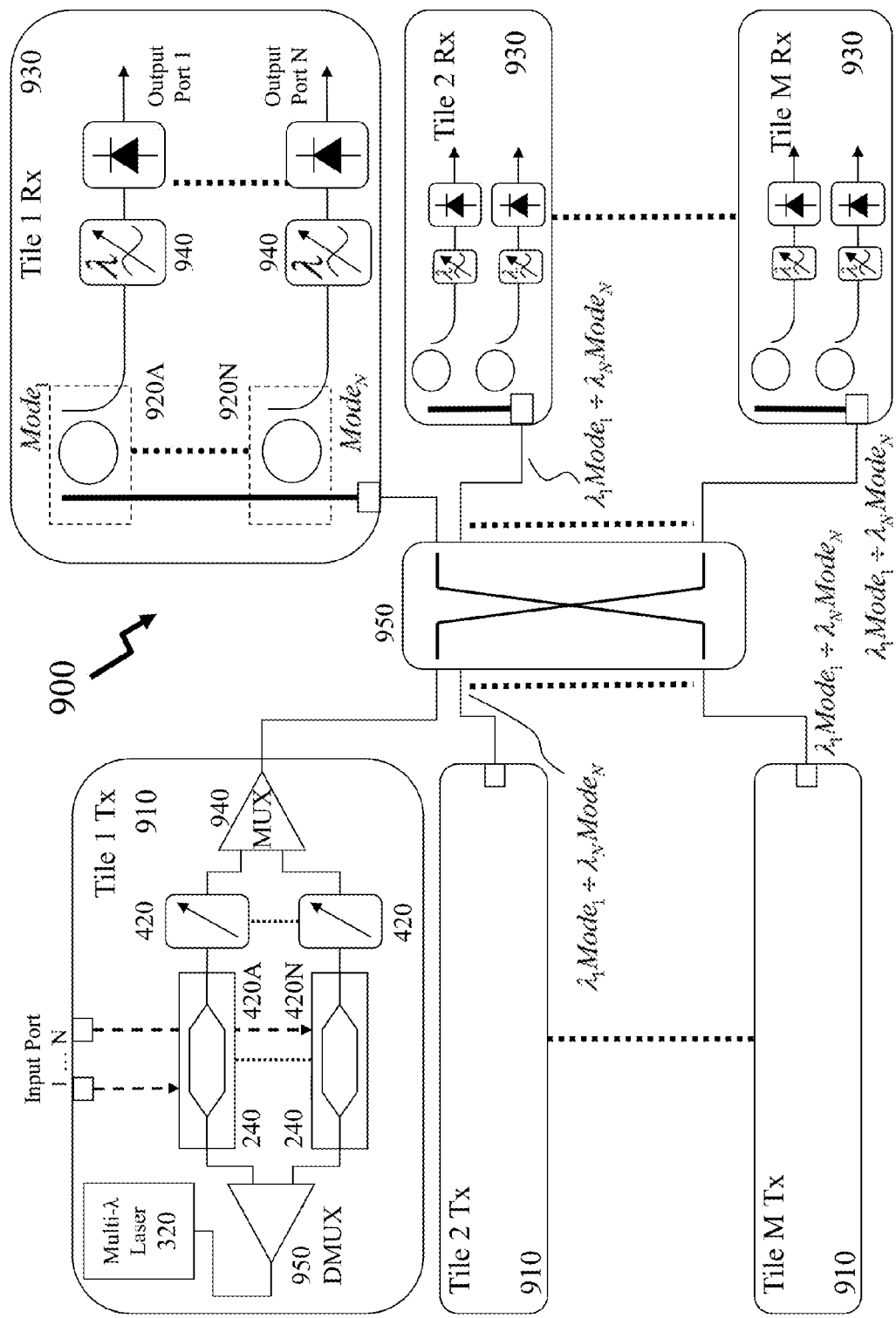
FIG. 9 depicts a matrix architecture, according to an embodiment of the invention, exploiting mode and wavelength dual domain division multiplexing via arrayed fixed wavelength tunable mode transmitters.

Referring to FIG. 9, there is depicted a matrix architecture 900 according to an embodiment of the invention exploiting mode and wavelength dual domain division multiplexing via arrayed fixed wavelength multiple mode transmitter tiles 910 coupled via a matrix 950 to a plurality of receiver tiles 930. Each transmitter tile 910 has an architecture similar to receiver times 810 in FIG. 8 except that rather than being single wavelength the transmitter tile 910 incorporates a multi-wavelength source 320 coupled to a wavelength demultiplexer (DMUX) wherein each wavelength is coupled to an external modulator 240 and therein mode converter 420 before being coupled through a wavelength multiplexer (MUX) 940 to the matrix 950. As matrix 950 provides distribution of each input port to all output ports each receiver tile 930 receives all wavelengths and all modes from the plurality of transmitter tiles 910. Within the receiver tile 910 there are a plurality of tunable mode filters 920A to 920N each providing a broadband mode filter for a predetermined mode $X=1 \leq Mode_X \leq X=N$. The output of each of the plurality of mode filters 920A to 920N is coupled to a receiver via a programmable wavelength filter 940. Accordingly, each receiver tile 930 can receive data from one or more transmitter tiles 910 simultaneously, whilst each transmitter tile 910 may similarly transmit to multiple receiver tiles 930.

Figure 10:
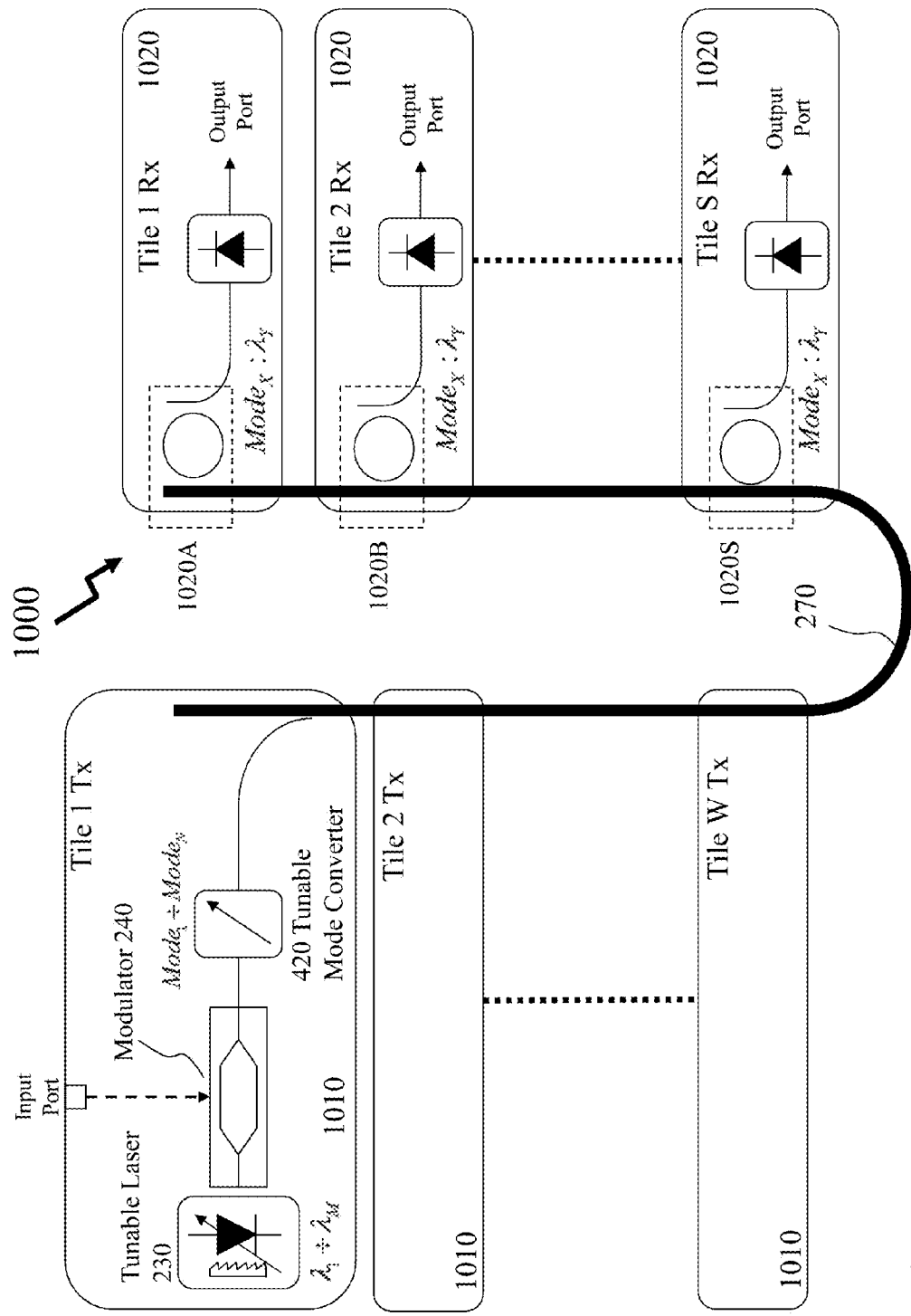
FIG. 10 depicts a bus/ring based architecture, according to an embodiment of the invention, exploiting mode and wavelength dual domain division multiplexing via tunable wavelength tunable mode transmitters.
Figure 11:
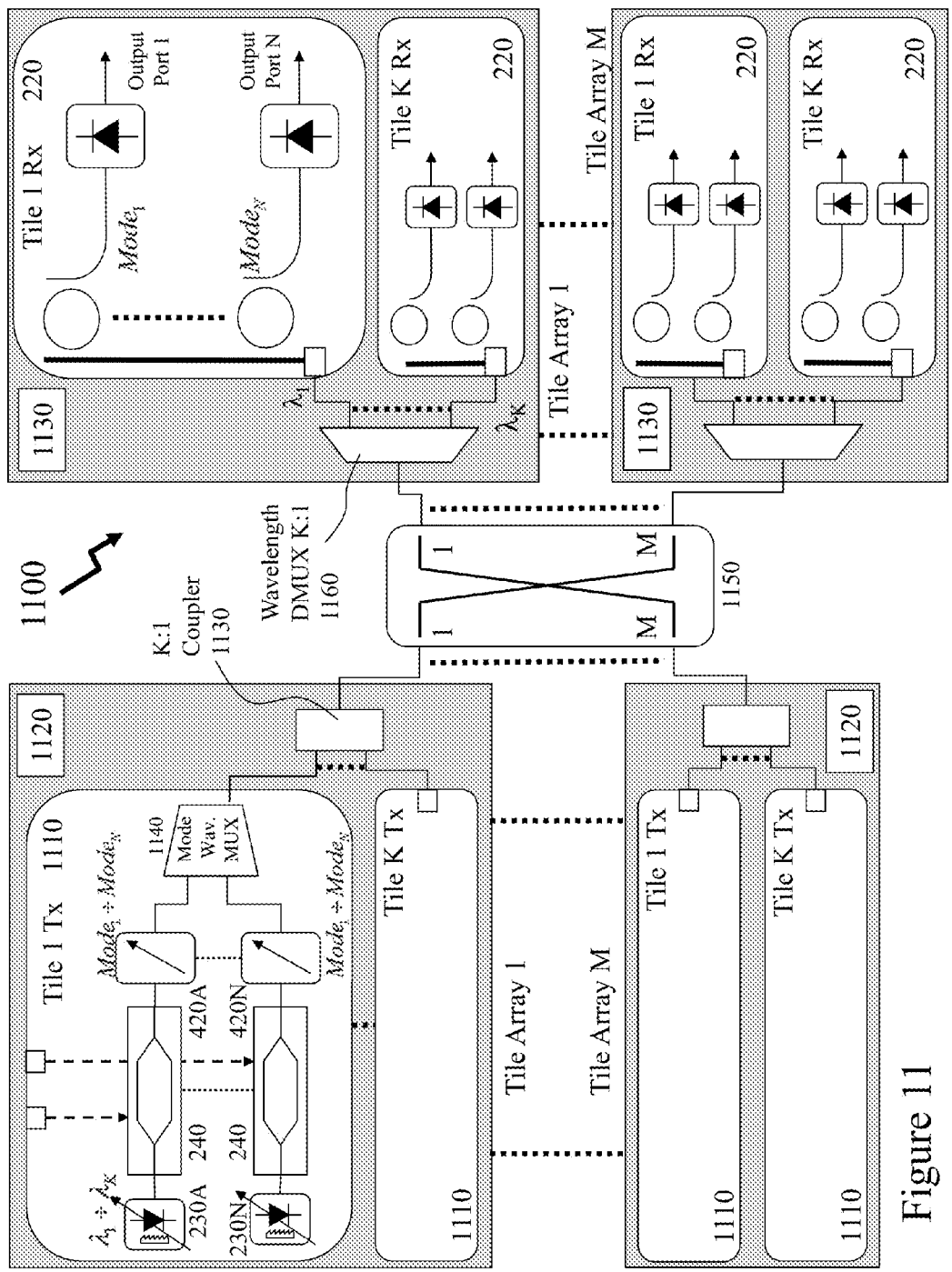
FIG. 11 depicts a matrix architecture, according to an embodiment of the invention, exploiting mode and wavelength dual domain division multiplexing via tunable wavelength tunable mode transmitters with wavelength specific receivers.

Now referring to FIG. 10, there is depicted a bus/ring based architecture 1000, according to an embodiment of the invention, exploiting mode and wavelength dual domain division multiplexing via tunable wavelength tunable mode transmitter tiles 1010 in conjunction with single mode wavelength specific receiver tiles 1020. Each transmitter tile 1010 of the plurality W of transmitter tiles 1010 comprises a tunable laser 230 in conjunction with external modulator 240 and tunable mode converter 420, such that it transmits on a single wavelength in a single mode but the wavelength and mode are tunable by the transmitter tile 1010 under control signals. Each of the plurality S of receiver tiles 1020 comprises a narrowband single mode filter 1020A to 1020S coupled to the optical bus 270 and a receiver within its receiver tile 1020. Accordingly, with each tunable laser 230 operating $\lambda_\alpha$ (1≤α≤M) and Mode$_\beta$ (1≤β≤N) and similarly each receiver tile 1020 implemented for single wavelength operation and single mode operation then it would be evident that W=S=M×N. Accordingly, a relatively large number of nodes, each with a transmitter tile 1010 and receiver tile 1020, may be supported on the optical bus 270 for modest {M, N}. The capacity of a node upon the optical bus 270 is then determined by the number of transmitter tiles 1010 and/or receiver tiles 1020, respectively associated with the node. In this manner, a node may be modular and incrementally increased in capacity as well as each transmitter tile 1010 and/or receiver tile 1020, respectively being according to some embodiments of the invention Referring to FIG. 11, there is depicted a matrix architecture 1100, according to an embodiment of the invention, exploiting space and mode and wavelength triple domain division multiplexing via tunable wavelength tunable mode transmitter tile arrays 1120 with wavelength specific receiver tile arrays 1130. As depicted each transmitter tile array 1130 comprises a plurality K of transmitter tiles 1110 which are essentially the same architecture as transmitter tiles 410 as described above, in respect of FIG. 4, wherein a plurality of N channels are implemented comprising tunable laser 230, external modulator 240, and tunable mode converter 420 but rather than each output being coupled separately to the optical bus 270 the plurality of N channels are multiplexed via a mode-wavelength MUX 1140. The outputs of the plurality K of transmitter tiles 1110 are then combined through a K:1 coupler 1130 to form the output from each transmitter tile array 1120 before being routed to matrix 1150.

The outputs from matrix 1150 are coupled to each receiver tile array 1130 wherein they are wavelength demultiplexed by K:1 wavelength demultiplexer (DMUX) 1160 to the plurality K receiver tiles 220 wherein each receiver tile 220 allows optical signals at the wavelength $\lambda_1 \leq \lambda_{RX} \leq \lambda_K$ to be separated by the plurality of mode filters and converted back to electrical signals by the receivers. Accordingly, with a M×M matrix 1150, M transmitter tile arrays 1120 are coupled to M receiver tile arrays 1130.

Accordingly, the M×M matrix 1150 should be able to accept, on each input port, multiple packets simultaneously arriving on different optical modes and wavelengths, and should be able to independently route each packet destined for an output port independent of the mode and wavelength.

Figure 12:
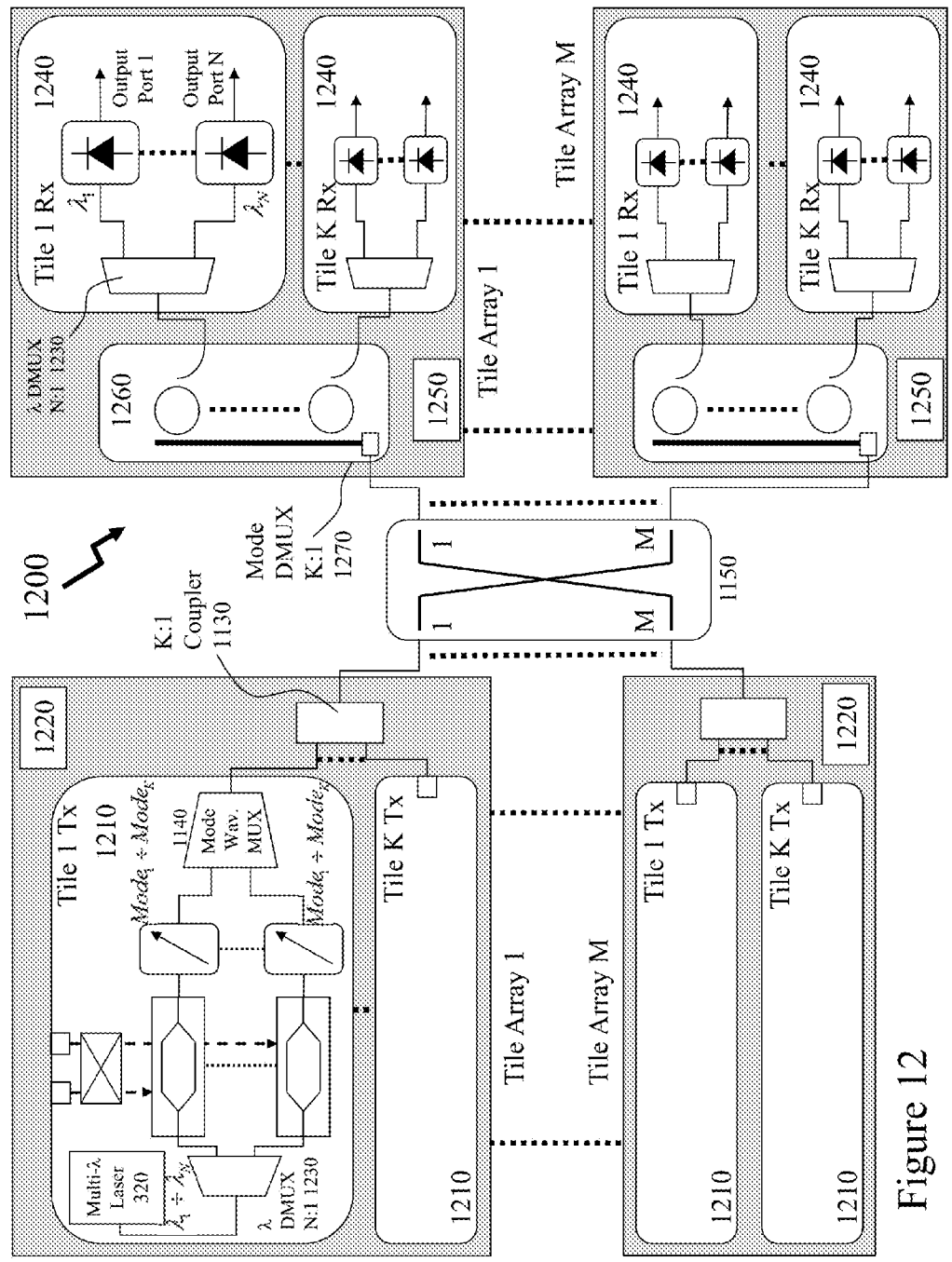
FIG. 12 depicts a matrix architecture, according to an embodiment of the invention, exploiting mode and wavelength dual domain division multiplexing via fixed wavelength fixed wavelength tunable mode transmitters with wavelength demultiplexed receivers.

Alternatively, as depicted in FIG. 12 the optical mode is employed to address a specific receiver tile 1240 within a receiver tile array 1250 and the wavelength employed to address a port within that receiver tile 1240. Accordingly, transmitter tiles 1210 are employed exploiting a multi-wavelength laser source 320 and a wavelength DMUX 1230 within a transmitter tile array 1220 and their outputs coupled to the K:1 coupler 1130 before being coupled to the M×M matrix 1150. Each output from the M×M matrix 1150 is then coupled to a mode demultiplexer 1270 upon each receiver tile array 1250 such that each mode Mode$_\beta$ (1≤β≤N) is coupled to a receiver tile 1240. Each receiver tile 1240 being a wavelength DMUX 1230 and an array of optical receivers.

Figure 13:
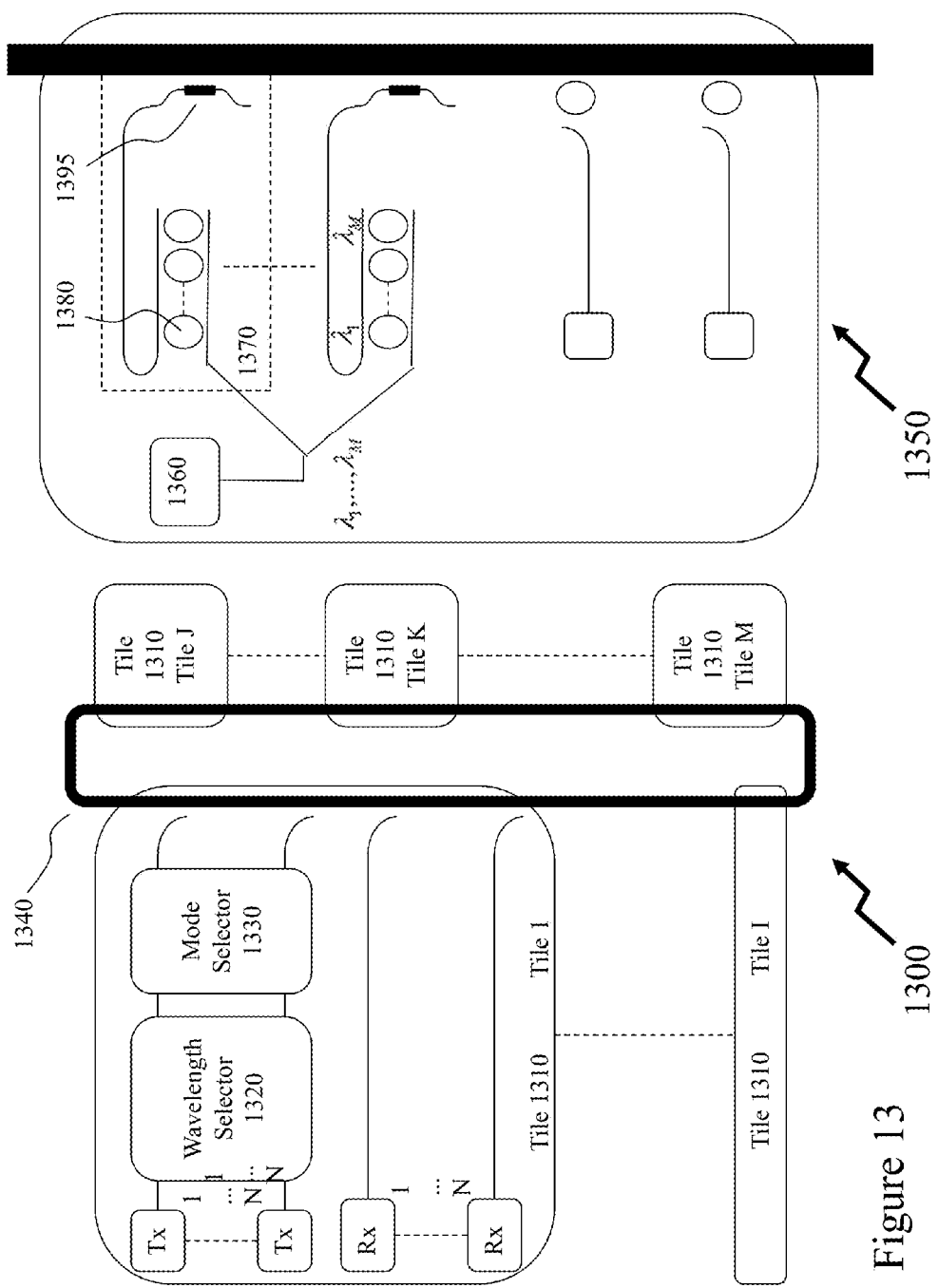
FIG. 13 depicts a mode and wavelength switched Interconnection Network (Net) implemented as a single monolithically integrated circuit.

FIG. 13 depicts a Mode and Wavelength switched Interconnection Network (MWIN) 1300 implemented as a single monolithically integrated circuit according to an embodiment of the invention. In common with preceding architectures described and depicted in respect of FIGS. 2 to 12 a high degree of parallelization is achieved with the generic architecture of the MWIN is organized using M tiles 1310, each one connected to a compute tile supporting, for example, a processor core, its memory cache (L1 and L2) and directory. The transmission side of the MWIN tiles 1310 supports N input ports, each one equipped with a transmitter (Tx). The N Tx's are connected (e.g. via wire bonding) to the electronic buffers, storing the messages to be switched between compute tiles. The receiver side of each tile 1310 supports N output ports, each one equipped with a receivers (Rx) connected (e.g. via wire bonding) to the compute tile. To enable switching of electrically-stored messages between any compute tiles 1310, the optical signals generated by the Tx's are sent through a wavelength selector 1320 and a mode selector 1330, which flexibly tune the proper wavelength and mode of the optical signals. The signals of all the tiles 1310 are then multiplexed on a single shared waveguide 1340, depicted with a ring topology in FIG. 13 although other geometries may be employed supporting all modes and wavelengths.

The MWIN may be employed in different configurations including two basic configurations, wavelength-mode and mode-wavelength, which are defined depending on how the destination tiles and ports are being identified. In the wavelength-mode configuration, see tile 1350 in FIG. 13, destination tile is uniquely identified by a specific wavelength ($\lambda_i$, i=1, . . . , M) and each output port of a tile is uniquely identified by a specific mode ($\mu_j$, j=1, . . . , N). In the mode-wavelength configuration (not illustrated), each destination tiles is identified by a specific mode ($\mu_i$, i=1, . . . , M) and each output port of a tile is identified by a unique wavelength ($\lambda_j$, j=1, . . . , N).

Accordingly, a building block (BB) of a tile 1350 for the wavelength-mode configuration of MWIN 1300 can be implemented as a silicon (Si) Photonic Integrated Circuit (PIC) comprising a multi-wavelength laser source 1360, followed by a power splitter with N branches 1370. Each branch is associated to a specific mode addressing a unique port of a tile. By controlling the micro-ring resonators 1380 on each branch, a wavelength is selected and modulated according to the scheduler decisions. Each modulated signal is then coupled to the shared waveguide 1340 through a mode coupler 1395 which selects a specific mode. The shared waveguide 1340 can be realized with a novel design consisting in an array of narrow waveguides designed to support orthogonal bound states referred as "supermodes". These supermodes can be exploited as the propagation modes of a conventional multi-mode waveguide with the advantage of lower inter-modal crosstalk.

Whilst the shared waveguide 1340 is depicted in MWIN 1300 as a ring it would be evident that other designs of the shared waveguide, the MWIN architecture, and the BBs may be employed without departing from the scope of the invention. For instance, the ring waveguide can be replaced by an open bus with potentially lower in-channel crosstalk while enabling all-to-all communications by properly placing the transmitting and receiving side of each tile. Some BBs can be dedicated or shared by different inputs, leading to different physical layer performance. Also, other PIC designs trading flexibility for complexity and energy efficiency, e.g. the number of laser sources, are possible for the wavelength and mode selectors. It would be evident that that different levels of complexity and performance exist between different possible implementations providing designer of MWINs with a design space for implementing embodiments of the invention rather than a single design.

Figure 14:
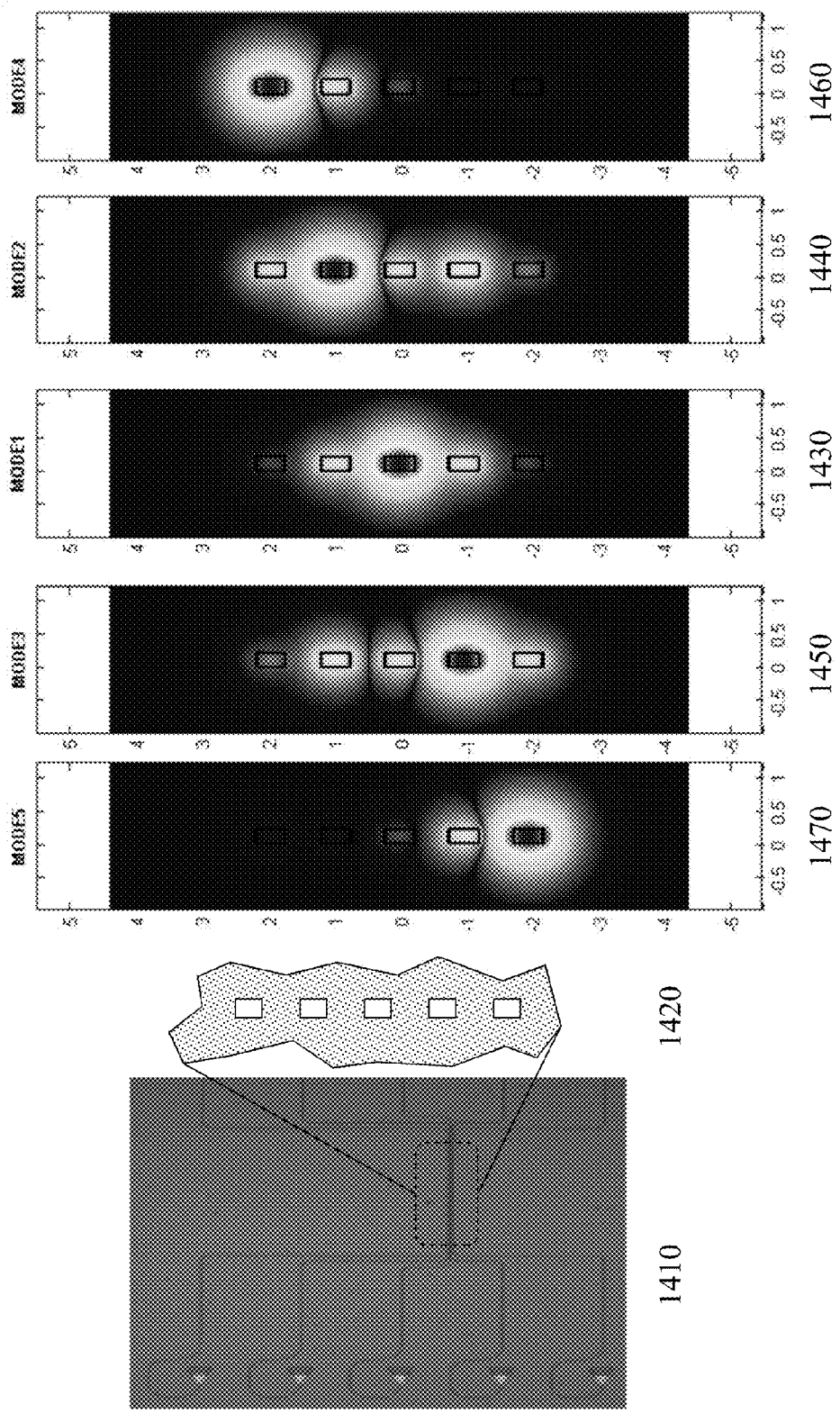
FIG. 14 depicts a coupled singlemode waveguide array and its resulting optical modes.
Figure 15:
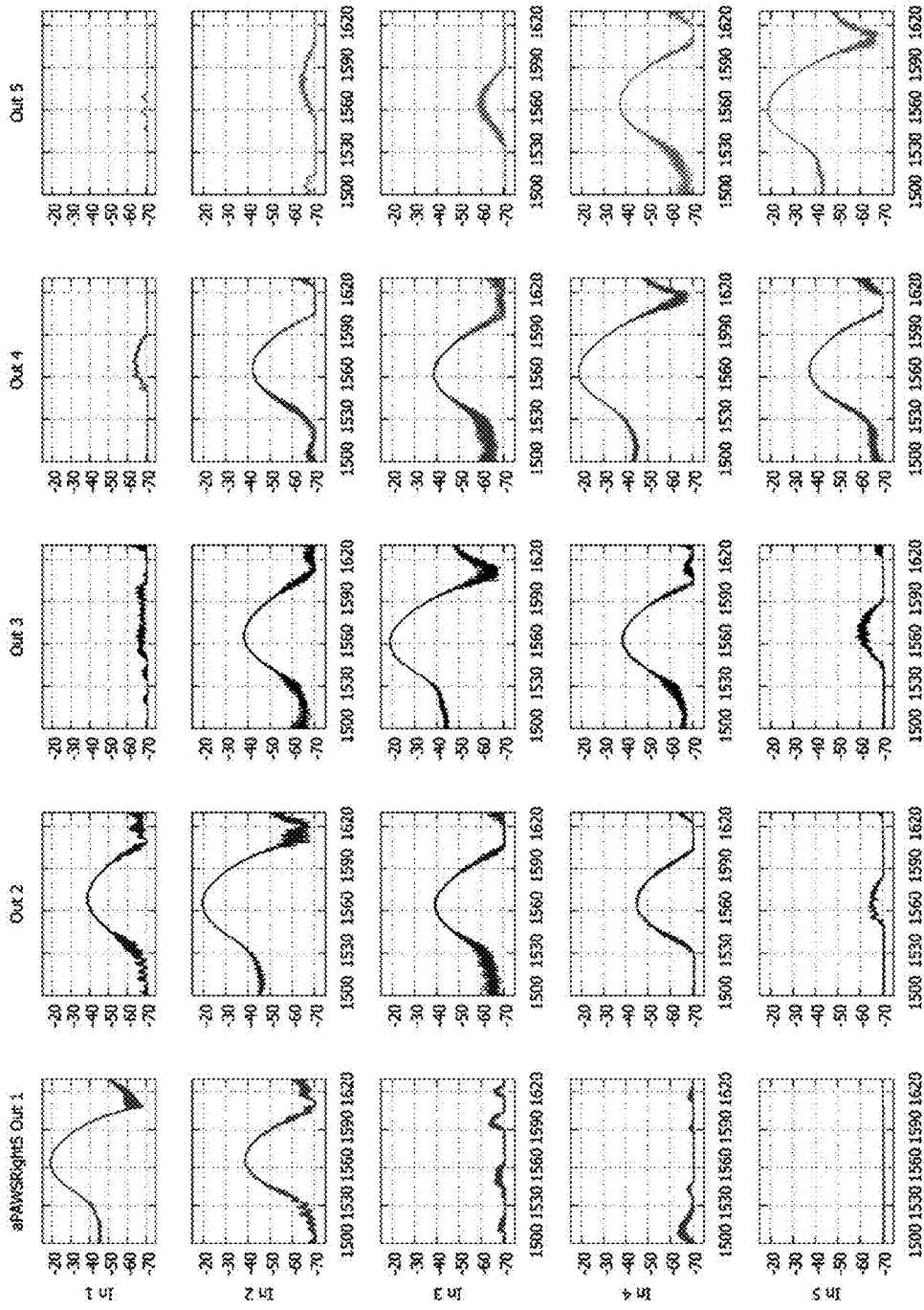
FIG. 15 depicts the coupling matrix between launch and output waveguides for an optimized waveguide structure supporting embodiments of the invention for mode selective filtering and launching.

Now referring to FIG. 14 there is depicted a coupled singlemode waveguide array (SMWA) 1420 and its resulting "supermode" optical modes, first to fifth mode profiles 1430 to 1470 respectively, such as may be employed for the shared waveguide/optical bus of embodiments of the invention. As depicted in optical micrograph 1410 the SMWA 1420 is a compact array of singlemode waveguides which are spaced such that optical coupling occurs between the waveguides wherein the resulting supermodes are defined by the properties of the multiple singlemode waveguides, their optical coupling, and the relative phases between them. A benefit of a SMWA is that the waveguide array can be designed to generate a set of orthogonal bound eigen-states, the supermodes, which are different from the set of modes propagating in standard multi-mode waveguides. Such a technique offers the advantage of lower inter-modal crosstalk, <−25 dB, with respect to the propagation in multimode waveguides. Moreover, an SMWA as evident from FIG. 16 allows an easier integration of electrical controls (e.g., each waveguide can be individually tuned) and has a footprint hardly larger than the size of a standard multi-mode waveguide. FIG. 14 depicts a set of five orthogonal supermodes, obtained on an array of five coupled Si waveguides with widths [430, 440, 450, 440, 430] nm and gaps of [550, 500, 500, 550] nm. Now referring to FIG. 15 there is depicted a coupling matrix between launch and output waveguides for an optimized waveguide structure supporting embodiments of the invention for supermode selective filtering and launching.

Figure 16:
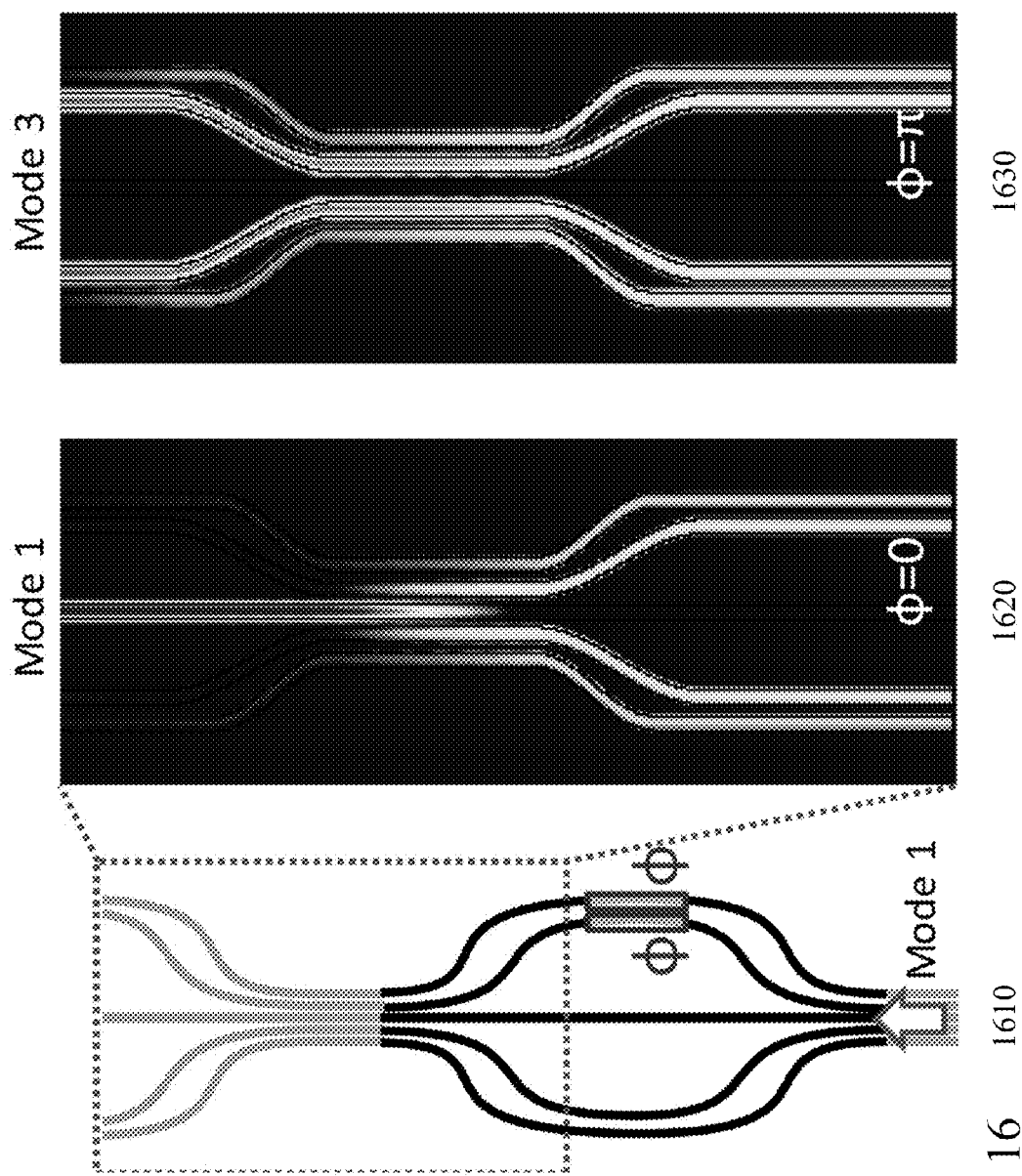
FIG. 16 depicts a multi-waveguide mode filter according to an embodiment of the invention for mode selective filtering and launching within mode selective receivers and transmitters according to embodiments of the invention.

Now referring to FIG. 16 there is depicted a multi-waveguide mode filter (MW-MF) according to an embodiment of the invention for supermode selective filterings and launching within mode selective receivers and transmitters according to embodiments of the invention. The MW-MF provides one possible PIC implementation of a mode selector according to an embodiment of the invention and exploits an array of coupled single-mode waveguides that are tapered to realize a structure where the optical power can be transferred from one supermode to another. An interferometer configuration is implemented with a phase shifter capable of inducing a generic shift on each arm to enable the generation of any mode $\mu_i$ ($1 \leq i \leq N$). The mode selector has been simulated with a commercial-grade eigenmode solver and propagator, assuming that the injected optical signal is at mode 1 at the input as depicted in schematic 1610. Simulation results of the working principle are shown in first and second simulation results 1620 and 1630 respectively. When the phase shift of the two rightmost arms is $\phi=0$, the mode of the output signal remains the same, i.e., mode 1 in which only the central waveguide is excited, see first simulation result 1620. When $\phi=\pi$, the mode of the output signal is changed to mode 3 as evident from second simulation result 1630 and where a clear mode switching between the two settings is visible.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art, in light of the above disclosure. The scope of the invention is to be defined only by the claims appended hereto, and by their equivalents. Whilst the embodiments of the invention described above in respect of FIGS. 2 through 16 employ amplitude modulation it would be evident that other modulation techniques may be employed including, but not limited to, phase modulation and coherent detection, frequency modulation, and polarization modulation.

Within the preceding descriptions with respect to embodiments of the invention optical signals are transmitted and received based upon exploiting mode division multiplexing discretely or in combination with wavelength division multiplexing. Whilst the preceding descriptions are primarily depicted and described with so-called "supermode" optical waveguides formed from an array of singlemode optical waveguides or dielectric structures (as each structure may not support optical waveguiding in isolation or themselves be multimode) it would be understood by one of skill in the art that these represent one class of multimode optical waveguide that may be employed within the embodiments of the invention. For example, the "supermode" optical waveguide may be replaced by a single multimode optical waveguide (multiple transverse modes) or a combination of one or more multimode optical waveguides alone or in combination with other dielectric structures and/or optical waveguides. For example, a photonic crystal supporting multiple transverse modes formed from sub-wavelength structures may be employed or multiple dielectric structures with narrow gaps etc.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An optical node comprising:
   an input port coupled to a first optical link supporting a plurality of wavelengths and plurality of transverse modes;
   an output port coupled to a second optical link supporting a plurality of wavelengths and a plurality of transverse modes;
   a third optical link coupled to the input port and the output port supporting the plurality of wavelengths and the plurality of transverse modes;
   at least one of:
      an optical transmitter block coupled to the third optical link for launching at the output port a generated optical signal at a predetermined wavelength of the plurality of wavelengths and a predetermined transverse mode of the plurality of transverse modes for transmission; and
      an optical receiver block coupled to the third optical link for extracting a received optical signal from the input port at a predetermined wavelength of the plurality of wavelengths and a predetermined transverse mode of the plurality of transverse modes, wherein
   the optical node is an optical node of a plurality of optical nodes; and
   the first optical links and second optical links and the third optical links are predetermined portions of a shared waveguide forming a predetermined portion of a photonic integrated circuit.

2. The optical node according to claim 1, wherein when the at least one of is an optical transmitter block it comprises:
   a multi-wavelength optical source emitting on M predetermined wavelengths;

a 1:N optical splitter coupled to the multi-wavelength optical source to generate N parallel multi-wavelength channels;

N optical wavelength selectors, each coupled to one of the N parallel multi-wavelength channels and selecting a predetermined wavelength of the M predetermined wavelengths; and N optical mode selectors, each coupled to the output of an optical wavelength selector and converting the received predetermined wavelength from the optical wavelength selector to a predetermined transverse mode of the plurality of transverse modes and coupling it to the third optical link.

3. The optical node according to claim 1, wherein when the at least one of is an optical receiver block it comprises:
   a plurality of optical mode selectors, each for coupling a predetermined optical signal from the third optical link to a photodetector, wherein the predetermined optical wavelength is a predetermined wavelength of the plurality of wavelengths and a predetermined transverse mode of the plurality of transverse modes.

4. The optical node according to claim 1, wherein the optical transmitter block, the optical receiver block, and the third optical link are all predetermined portions of a photonic integrated circuit.

5. The optical node according to claim 1, wherein the optical mode converter comprises either:
   a first converter comprising
      an input section comprising at least one of a plurality of R closely spaced singlemode optical waveguides with first predetermined spacings that separate or a multimode waveguide and an output comprising R singlemode optical waveguides with second predetermined spacings;
      a phase modulation section comprising R singlemode optical waveguides with predetermined second spacings coupled to the output of the input section;
      an output section comprising a coupler coupled to the other end of the phase modulation section and tapering to a central portion comprising the R closely spaced singlemode optical waveguides with first predetermined spacings and an output section wherein the R closely spaced singlemode optical waveguides separate to R singlemode optical waveguides with third predetermined spacings; and
      a plurality of electrodes associated with a predetermined subset of the R singlemode optical waveguides with predetermined second spacings, wherein inducing predetermined phase shifts within a predetermined subset of the R singlemode optical waveguides with predetermined second spacings results in an optical transverse mode of the plurality of optical transverse modes supported by the plurality of R closely spaced singlemode optical waveguides received at the input being converted to another optical transverse mode of the plurality of optical transverse modes at the output; and
   a second converter comprising:
      a multimode optical waveguide supporting a plurality of modes, wherein each mode is a predetermined transverse mode of the plurality of transverse modes;
      a launch singlemode optical waveguide; and
      a coupler for coupling the single mode of the launch waveguide to a predetermined mode of the multimode optical waveguide.

6. The optical node according to claim 1, wherein the predetermined transverse mode of the plurality of transverse modes for the at least one of the received optical signal and the generated optical signal is either fixed in dependence upon an aspect of the optical node or tunable.

7. The optical node according to claim 1, wherein when the at least one of is an optical transmitter block it comprises:
   a remote multi-wavelength laser and a wavelength demultiplexer;
   a wavelength selector comprising a plurality of wavelength selective elements; and
   a mode selector comprising a plurality of mode selective elements, wherein each mode selective element is coupled to a predetermined wavelength selective element and converts the received predetermined wavelength from the optical wavelength selector to a predetermined transverse mode of the plurality of transverse modes and coupling it to the third optical link.

8. The optical node according to claim 1, wherein when the at least one of is an optical transmitter block it comprises:
   a plurality of wavelength tunable optical sources; and
   a mode selector comprising a plurality of mode selective elements, wherein each mode selective element is coupled to a predetermined wavelength selective element and converts the received predetermined wavelength from the optical wavelength selector to a predetermined transverse mode of the plurality of transverse modes and coupling it to the third optical link.

9. The optical node according to claim 1, wherein when the at least one of is an optical transmitter block it comprises:
   a remote multi-wavelength laser;
   a wavelength selector comprising a plurality of wavelength selective elements, each wavelength selective element for removing a predetermined portion of the optical signals received from the remote multi-wavelength laser; and
   a mode selector comprising a plurality of mode selective elements, wherein each mode selective element is coupled to a predetermined wavelength selective element and converts the received predetermined wavelength from the optical wavelength selector to a predetermined transverse mode of the plurality of transverse modes and coupling it to the third optical link.

10. The optical node according to claim 1, wherein when the at least one of is an optical transmitter block it comprises:
    a plurality of fixed wavelength optical sources;
    a mode selector comprising a plurality of mode selective elements, wherein each mode selective element is coupled to a predetermined fixed wavelength optical source of the plurality of fixed wavelength optical sources and converts the received predetermined wavelength to a predetermined transverse mode of the plurality of transverse modes and coupling it to the third optical link.

11. The optical node according to claim 1, wherein when the at least one of is an optical transmitter block it comprises:
    a fixed wavelength optical source;
    a splitter coupled to the fixed wavelength optical source and generating a plurality of outputs a mode selector comprising a plurality of mode selective elements, wherein each mode selective element is coupled to an output of the splitter and converts the received optical signal to a predetermined transverse mode of the plurality of transverse modes and coupling it to the third optical link.

12. The optical node according to claim 1, wherein when the at least one of is an optical receiver block it comprises:
a mode selector comprising a plurality of mode selective elements, wherein each mode selective element is coupled to the third optical link and converts a received predetermined transverse mode of the plurality of transverse modes to an output mode; and
a wavelength selector block comprising a plurality of wavelength selective elements, wherein each wavelength selective element is coupled to a mode selective element and filters the output mode to a predetermined wavelength range.

13. The optical node according to claim 1, wherein when the at least one of is an optical receiver block it comprises:
a mode selector comprising a plurality of mode selective elements, wherein each mode selective element is coupled to the third optical link and couples a predetermined transverse mode of the plurality of transverse modes at a predetermined wavelength to an output mode.

14. The optical node according to claim 1, wherein when the at least one of is an optical receiver block it comprises:
a mode selector comprising a plurality of mode selective elements, wherein each mode selective element is coupled to the third optical link and converts a received predetermined transverse mode of the plurality of transverse modes to an output mode; and
a wavelength demultiplexer for generating a plurality of outputs from the output mode, each output having a predetermined wavelength range.

15. The optical node of claim 1 wherein the shared waveguide is an open bus shared waveguide.

16. The optical node of claim 1 wherein the shared waveguide is a closed loop shared waveguide.

17. An optical node comprising:
an input port coupled to a first optical link supporting a plurality of wavelengths and plurality of transverse modes;
an output port coupled to a second optical link supporting a plurality of wavelengths and a plurality of transverse modes;
a third optical link coupled to the input port and the output port supporting the plurality of wavelengths and the plurality of transverse modes;
at least one of:
an optical transmitter block coupled to the third optical link for launching at the output port a generated optical signal at a predetermined wavelength of the plurality of wavelengths and a predetermined transverse mode of the plurality of transverse modes for transmission; and
an optical receiver block coupled to the third optical link for extracting a received optical signal from the input port at a predetermined wavelength of the plurality of wavelengths and a predetermined transverse mode of the plurality of transverse modes, wherein
the optical node is an optical node of a plurality of optical nodes; and
the first optical links and second optical links and the third optical links are each formed from a pair of shared waveguides, wherein the optical transmitter blocks of the plurality of optical nodes are associated with a first shared waveguide of the pair of shared waveguides and the optical receiver blocks of the plurality of optical nodes are associated with a second shared waveguide of the pair of shared waveguides.

18. An optical node comprising:
an input port coupled to a first optical link supporting a plurality of wavelengths and plurality of transverse modes;
an output port coupled to a second optical link supporting a plurality of wavelengths and a plurality of transverse modes;
a third optical link coupled to the input port and the output port supporting the plurality of wavelengths and the plurality of transverse modes;
at least one of:
an optical transmitter block coupled to the third optical link for launching at the output port a generated optical signal at a predetermined wavelength of the plurality of wavelengths and a predetermined transverse mode of the plurality of transverse modes for transmission; and
an optical receiver block coupled to the third optical link for extracting a received optical signal from the input port at a predetermined wavelength of the plurality of wavelengths and a predetermined transverse mode of the plurality of transverse modes, wherein
a shared waveguide comprising either:
a plurality of closely spaced singlemode optical waveguides wherein the resulting array of optical waveguides support a plurality of modes, wherein each mode is a predetermined transverse mode of the plurality of transverse modes; and
a single optical waveguide supporting a plurality of modes, wherein each mode is a predetermined transverse mode of the plurality of transverse modes.

* * * * *